(12) United States Patent
MacFarlane et al.

(10) Patent No.: US 12,031,220 B2
(45) Date of Patent: Jul. 9, 2024

(54) ELECTROLYTIC COMPOSITION AND CATHODE FOR THE NITROGEN REDUCTION REACTION

(71) Applicant: MONASH UNIVERSITY, Clayton (AU)

(72) Inventors: Douglas R. MacFarlane, Clayton (AU); Bryan Harry Rahmat Suryanto, Clayton (AU); Dabin Wang, Clayton (AU); Hoang-Long Du, Clayton (AU)

(73) Assignee: MONASH UNIVERSITY, Clayton (AU)

( * ) Notice: Subject to any disclaimer, the term of this patent is extended or adjusted under 35 U.S.C. 154(b) by 790 days.

(21) Appl. No.: 16/972,160

(22) PCT Filed: Jun. 27, 2019

(86) PCT No.: PCT/AU2019/050671
§ 371 (c)(1),
(2) Date: Dec. 4, 2020

(87) PCT Pub. No.: WO2020/000044
PCT Pub. Date: Jan. 2, 2020

(65) Prior Publication Data
US 2021/0238756 A1 Aug. 5, 2021

(30) Foreign Application Priority Data
Jun. 28, 2018 (AU) .................. 2018902324

(51) Int. Cl.
*C25B 11/054* (2021.01)
*C25B 1/27* (2021.01)
(Continued)

(52) U.S. Cl.
CPC ............. *C25B 11/054* (2021.01); *C25B 1/27* (2021.01); *C25B 11/057* (2021.01);
(Continued)

(58) Field of Classification Search
CPC .......... C25B 11/067; C25B 1/00; C25B 1/27; C25B 11/051; C25B 11/057; C25B 11/054; C25B 11/081
See application file for complete search history.

(56) References Cited

U.S. PATENT DOCUMENTS

| 10,702,857 B2 * | 7/2020 | Zhang ................. B01J 35/002 |
| 2008/0149493 A1 * | 6/2008 | Friesen ................. C25B 1/00 204/229.1 |

(Continued)

FOREIGN PATENT DOCUMENTS

| WO | 2017132721 A1 | 8/2017 | |
| WO | WO-2018013055 A1 * | 1/2018 | ............... C25B 1/04 |

OTHER PUBLICATIONS

Dumesic et al. "Surface, Catalytic and Magnetic Properties of Small Iron Particles" Journal of Catalysis 37, 503-512 (1975). (Year: 1975).*

(Continued)

*Primary Examiner* — Alexander W Keeling
*Assistant Examiner* — Alexander R. Parent
(74) *Attorney, Agent, or Firm* — Norris McLaughlin PA

(57) ABSTRACT

The invention provides a cathode for the nitrogen reduction reaction, comprising an electrically conductive substrate and an electrocatalytic composition on the substrate, wherein the electrocatalytic composition comprises: a support material present in one or more crystalline phases; and metallic clusters dispersed on the support material, the metallic clusters comprising at least one metal selected from ruthenium, iron, rhodium, iridium and molybdenum, wherein at (Continued)

least 80 mass % of the support material is present in a semiconductive crystalline phase having a conduction band minimum energy below (more positive than) −0.3 V relative to the normal hydrogen electrode (NHE).

20 Claims, 8 Drawing Sheets

(51) Int. Cl.
  *C25B 11/057* (2021.01)
  *C25B 11/067* (2021.01)
  *C25B 11/081* (2021.01)
  *C25B 15/08* (2006.01)

(52) U.S. Cl.
  CPC .......... *C25B 11/067* (2021.01); *C25B 11/081* (2021.01); *C25B 15/08* (2013.01)

(56) References Cited

U.S. PATENT DOCUMENTS

2016/0194767 A1\* 7/2016 Mulder ................... C25B 11/04
  205/552
2016/0218371 A1 7/2016 Niangar

OTHER PUBLICATIONS

Strongin et al. "The Importance of C7 Sites and Surface Roughness in the Ammonia Synthesis Reaction over Iron" Journal of Catalysis 103, 213-215 (1987) (Year: 1987).\*
Kaden et al. "Electronic Structure Controls Reactivity of Size-Selected Pd Clusters Adsorbed on TiO2 Surfaces" Science Nov. 6, 2009 vol 326, Issue 5954 pp. 826-829 (Year: 2009).\*
Lan et al. "Synthesis of ammonia directly from air and water at ambient temperature and pressure" Scientific Reports 3:1145 (2013) (Year: 2013).\*
Cheng et al. "Platinum single-atom and cluster catalysis of the hydrogen evolution reaction" Nature Communications 7:13638 2016 (Year: 2016).\*
Sun et al. "Electrochemical Ammonia Synthesis via Nitrogen Reduction Reaction on a MoS2 Catalyst: Theoretical and Experimental Studies" Adv. Mater. 2018, 30, 1800191 (Year: 2018).\*
Shi et al. "Anchoring PdCu Amorphous Nanocluster on Graphene for Electrochemical Reduction of N2 to NH3 under Ambient Conditions in Aqueous Solution" Adv. Energy Mater. 2018, 8, 1800124 (Year: 2018).\*
Li et al. "Accelerated Dinitrogen Electroreduction to Ammonia via Interfacial Polarization Triggered by Single-Atom Protrusions" Chem 6, 885-901 2020 (Year: 2020).\*
International Search Report for corresponding application PCT/AU2019/050671 dated Aug. 2, 2019.

\* cited by examiner

ELECTROLYTIC COMPOSITION AND CATHODE FOR THE NITROGEN REDUCTION REACTION

This is an application filed under 35 USC 371 of PCT/AU2019/050671, filed 27 Jun. 2019, which claims priority to AU 2018902324, filed 28 Jun. 2018. The present application claims all priority benefits of the foregoing identified applications, as well as incorporating the entirety of their disclosures herein by reference thereto.

TECHNICAL FIELD

The invention relates to electrocatalytic compositions for the nitrogen reduction reaction and to methods of producing such electrocatalytic compositions. The invention also relates to cathodes for the nitrogen reduction reaction comprising an electrocatalytic composition, and an electrochemical cell for reduction of dinitrogen to ammonia, which includes such a cathode. The invention further relates to methods of reducing dinitrogen to ammonia on an electrocatalytic composition. The electrocatalytic compositions generally comprise a support material predominantly present in a semiconductive crystalline phase with a low conduction band minimum energy, and a metallic composition comprising at least one metal selected from ruthenium, iron, rhodium, iridium and molybdenum dispersed on the support material.

BACKGROUND OF INVENTION

Providing food and energy sufficient to meet the requirements of a burgeoning world population remains an ongoing challenge for humanity. New technologies for dinitrogen ($N_2$) fixation to form ammonia ($NH_3$) offer potential solutions to both of these challenges: synthetic ammonia-based fertilizers are already critical to global food production and the high energy density of $NH_3$ provides a significant prospect for its use as a transportable fuel or carrier of renewable energy.

The invention of the Haber-Bosch process in the 20th century provided for the first time an industrial route to produce large volumes of synthetic ammonia. However, due to the exceptional stability of the dinitrogen triple bond ($N\equiv N$, 942 kJ mol$^{-1}$), the Haber-Bosch process requires extreme reaction conditions of elevated pressure (150-350 atm) and temperature (400-550° C.), as well as a supply of pure $H_2$ which is typically sourced from the steam reforming process of natural gas. Consequently, the process consumes approximately 2% of global energy supply and contributes ~1.5% of global greenhouse gas emissions. Technologies for $N_2$ conversion to $NH_3$ which can be powered by renewable resources are thus urgently needed.

The development of a successful electrochemical nitrogen reduction reaction (NRR) process would enable the direct conversion of electricity into $NH_3$ in a simple electrolytic cell. The cathodic half-reaction of the NRR is shown in equation (1):

$$N_2 + 6H^+ + 6e^- \rightarrow 2NH_3 \tag{1}$$

Instead of relying on steam reformed $H_2$, the protons required for NRR can be supplied by anodic oxidation of water (the oxygen evolution reaction) or of $H_2$ generated from sustainable water-splitting processes. Unfortunately, the 6e$^-$ and 6H$^+$ NRR is kinetically sluggish and thus electrochemically disadvantaged over the more facile 2e$^-$ and 2H$^+$ hydrogen evolution reaction (HER) shown in equation (2).

$$2H^+ + 2e^- \rightarrow H_2 \tag{2}$$

As a result of competition from the HER, many reported electrocatalysts suffer both from very low faradaic efficiency and/or low $NH_3$ yield rates when evaluated in aqueous electrolytes. Moreover, some reports of high faradaic efficiencies are regarded with scepticism by those skilled in the art (absent evidence of high ammonia yield rates over extended periods of time) due to residual nitrogen contaminants in the catalysts, particularly when ammonium salt precursors were used (see e.g. Ozin, "Nitrogen Reduction Reactions: Fact or Artifact", *Advanced Science News* 2018, March 2018).

Selectivity with a given electrocatalyst may be improved by adopting process strategies to increase the relative availability of $N_2$ vs reducible hydrogen, for example using aprotic electrolytes, such as ionic liquids, and elevated nitrogen pressures. However, in order to successfully produce ammonia at commercial scale, selective and active NRR electrocatalysts are required, and in particular electrocatalysts that intrinsically suppress the HER relative to the NRR.

There is therefore an ongoing need for new electrocatalytic compositions for the nitrogen reduction reaction, and methods of reducing nitrogen using such compositions, which at least partially address one or more of the above-mentioned short-comings, or provide a useful alternative.

A reference herein to a patent document or other matter which is given as prior art is not to be taken as an admission that the document or matter was known or that the information it contains was part of the common general knowledge as at the priority date of any of the claims.

SUMMARY OF INVENTION

In accordance with a first aspect the invention provides a cathode for the nitrogen reduction reaction, comprising an electrically conductive substrate and an electrocatalytic composition on the substrate, wherein the electrocatalytic composition comprises: a support material present in one or more crystalline phases; and metallic clusters dispersed on the support material, the metallic clusters comprising at least one metal selected from ruthenium, iron, rhodium, iridium and molybdenum, wherein at least 80 mass % of the support material is present in a semiconductive crystalline phase having a conduction band minimum energy below (more positive than) −0.3 V relative to the normal hydrogen electrode (NHE).

In some embodiments, the cathode for the nitrogen reduction reaction comprises an electrically conductive substrate and an electrocatalytic composition on the substrate, wherein the electrocatalytic composition comprises: a support material present in one or more crystalline phases; and metallic clusters dispersed on the support material, the metallic clusters comprising at least one metal selected from ruthenium, iron, rhodium and iridium, wherein at least 80 mass % of the support material is present in a semiconductive crystalline phase having a conduction band minimum energy below (more positive than) −0.3 V relative to the normal hydrogen electrode (NHE).

In accordance with a second aspect the invention provides an electrochemical cell for reduction of dinitrogen to ammonia, comprising: a cathode according to any embodiment of the first aspect disclosed herein; an anode; a feed inlet to the cell to convey dinitrogen for reduction on the electrocatalytic composition; and a power supply connected to the cathode and the anode, the power supply capable of providing a potential at the cathode sufficient to reduce dinitrogen on the electrocatalytic composition.

In accordance with a third aspect the invention provides a method of reducing dinitrogen to ammonia, the method comprising: contacting an electrocatalytic composition with dinitrogen and an electrolyte comprising a source of hydrogen; and applying a potential at the electrocatalytic composition sufficient to reduce the dinitrogen and the source of hydrogen on the electrocatalytic composition to form ammonia, wherein the electrocatalytic composition comprises: a support material present in one or more crystalline phases; and metallic clusters dispersed on the support material, the metallic clusters comprising at least one metal selected from ruthenium, iron, rhodium, iridium and molybdenum, wherein at least 80 mass % of the support material is present in a semiconductive crystalline phase having a conduction band minimum energy below (more positive than) −0.3 V relative to the normal hydrogen electrode (NHE).

In some embodiments of the third aspect the method of reducing dinitrogen to ammonia comprises: contacting an electrocatalytic composition with dinitrogen and an electrolyte comprising a source of hydrogen; and applying a potential at the electrocatalytic composition sufficient to reduce the dinitrogen and the source of hydrogen on the electrocatalytic composition to form ammonia, wherein the electrocatalytic composition comprises: a support material present in one or more crystalline phases; and metallic clusters dispersed on the support material, the metallic clusters comprising at least one metal selected from ruthenium, iron, rhodium and iridium, wherein at least 80 mass % of the support material is present in a semiconductive crystalline phase having a conduction band minimum energy below (more positive than) −0.3 V relative to the normal hydrogen electrode (NHE).

In some embodiments of the first and third aspects, at least 90 mass %, or at least 95 mass %, or at least 98 mass %, or substantially all of the support material is present in the semiconductive crystalline phase.

In some embodiments of the first and third aspects, the semiconductive crystalline phase has a conduction band minimum energy below (more positive than) 0 V relative to the normal hydrogen electrode (NHE).

In some embodiments of the first and third aspects, the support material comprises a transition metal oxide or sulphide. In some embodiments, the support material comprises at least one selected from molybdenum disulphide ($MoS_2$), ferric oxide ($Fe_2O_3$) and titanium dioxide ($TiO_2$).

In some embodiments of the first and third aspects, the metallic clusters have an average cluster size of from 1 to 10 nm, or from 1 to 3 nm.

In some embodiments of the first and third aspects, the support material is present in catalyst particles having an average particle size of between 10 nm and 10 μm.

In some embodiments of the first and third aspects, the semiconductive crystalline phase is a 2D-crystalline phase. The metallic clusters may be at least partially intercalated between layers of the 2D-crystalline phase. The layers may have an average thickness of 2 or more, such as from 2 to 10, stacked 2D monolayers.

In some embodiments of the first and third aspects, the support material comprises molybdenum disulphide ($MoS_2$) and the 2D-crystalline phase comprises $2H-MoS_2$.

In some embodiments of the first and third aspects, the metallic clusters comprise ruthenium or iron. In some embodiments, the metallic clusters comprise ruthenium.

In some embodiments of the third aspect, the electrocatalytic composition is present on a cathode according to any embodiment of the first aspect disclosed herein.

In some embodiments of the third aspect, the method is performed using an electrochemical cell according to any embodiment of the second aspect disclosed herein.

In some embodiments of the third aspect, the potential is in the range of −50 mV to −500 mV relative to the reversible hydrogen electrode (RHE).

In some embodiments of the third aspect the potential is below the onset potential for the hydrogen evolution reaction.

In some embodiments of the third aspect, the method further comprises providing or replenishing the source of hydrogen in the electrolyte by oxidising a hydrogen-containing species at an anode in electrochemical communication with the electrolyte.

In some embodiments of the third aspect, the method further comprises recovering a product stream comprising the ammonia. In some such embodiments, the method further comprises recycling dihydrogen ($H_2$) present in the product stream for contact with the electrocatalytic composition and/or for oxidation at an anode in electrochemical communication with the electrolyte.

In some embodiments of the third aspect, the method further comprises dissolving dinitrogen in the electrolyte by contacting the electrolyte with dinitrogen at a partial pressure of between 0.7 bar and 100 bar, or between 1 bar and 30 bar, or between 1 bar and 12 bar.

In some embodiments of the third aspect, the electrolyte is an aqueous liquid having a pH in the range of 0 to 14. In other embodiments, the electrolyte comprises an ionic liquid.

In accordance with a fourth aspect, the invention provides an electrocatalytic composition for the nitrogen reduction reaction, comprising: a support material present in one or more crystalline phases; and metallic clusters dispersed on the support material, the metallic clusters comprising at least one metal selected from ruthenium, iron, rhodium, iridium and molybdenum, wherein at least 80 mass % of the support material is present in a semiconductive 2D-crystalline phase having a conduction band minimum energy below (more positive than) −0.3 V relative to the normal hydrogen electrode (NHE).

In some embodiments of the fourth aspect, the electrocatalytic composition for the nitrogen reduction reaction comprises: a support material present in one or more crystalline phases; and metallic clusters dispersed on the support material, the metallic clusters comprising at least one metal selected from ruthenium, iron, rhodium and iridium, wherein at least 80 mass % of the support material is present in a semiconductive 2D-crystalline phase having a conduction band minimum energy below (more positive than) −0.3 V relative to the normal hydrogen electrode (NHE).

In some embodiments of the fourth aspect, at least 90 mass %, or at least 95 mass %, or at least 98 mass %, or substantially all of the support material is present in the semiconductive 2D-crystalline phase.

In some embodiments of the fourth aspect, the semiconductive 2D-crystalline phase has a conduction band minimum energy below (more positive than) 0 V relative to the normal hydrogen electrode (NHE).

In some embodiments of the fourth aspect, the metallic clusters have an average cluster size of from 1 to 10 nm, or from 1 to 3 nm.

In some embodiments of the fourth aspect, the support material is present in catalyst particles having an average particle size of between 0.1 μm and 10 μm.

In some embodiments of the fourth aspect, the metallic clusters are at least partially intercalated between layers of the 2D-crystalline phase. The layers may have an average thickness of more than 2, such as from 2 to 10 stacked 2D monolayers.

In some embodiments of the fourth aspect, the support material comprises molybdenum disulphide ($MoS_2$) and the 2D-crystalline phase comprises $2H\text{-}MoS_2$.

In some embodiments of the fourth aspect, the metallic clusters comprise ruthenium or iron. In some embodiments the metallic clusters comprise ruthenium.

In accordance with a fifth aspect, the invention provides an electrocatalytic composition for the nitrogen reduction reaction, comprising: a support material present in one or more crystalline phases, wherein at least 80 mass % of the support material is present in a semiconductive 2D-crystalline phase having a conduction band minimum energy below (more positive than) −0.3 V relative to the normal hydrogen electrode (NHE); and a metallic composition dispersed on the support material, wherein the metallic composition comprises at least one metal selected from ruthenium, iron, rhodium, iridium and molybdenum, and wherein the metallic composition is at least partially intercalated between layers of the semiconductive 2D-crystalline phase.

In some embodiments of the fifth aspect, the electrocatalytic composition for the nitrogen reduction reaction comprises: a support material present in one or more crystalline phases, wherein at least 80 mass % of the support material is present in a semiconductive 2D-crystalline phase having a conduction band minimum energy below (more positive than) −0.3 V relative to the normal hydrogen electrode (NHE); and a metallic composition dispersed on the support material, wherein the metallic composition comprises at least one metal selected from ruthenium, iron, rhodium and iridium, and wherein the metallic composition is at least partially intercalated between layers of the semiconductive 2D-crystalline phase In accordance with a sixth aspect, the invention provides an electrocatalytic composition for the nitrogen reduction reaction, comprising: molybdenum disulphide ($MoS_2$); and metallic clusters dispersed on the $MoS_2$, the metallic clusters comprising at least one metal selected from ruthenium, iron, rhodium, iridium and molybdenum, wherein at least 80 mass % of the $MoS_2$ is present in the 2H-polymorphic form.

In some embodiments of the sixth aspect, the electrocatalytic composition for the nitrogen reduction reaction comprises: molybdenum disulphide ($MoS_2$); and metallic clusters dispersed on the $MoS_2$, the metallic clusters comprising at least one metal selected from ruthenium, iron, rhodium and iridium, wherein at least 80 mass % of the $MoS_2$ is present in the 2H-polymorphic form.

In some embodiments of the sixth aspect, the metallic clusters are at least partially intercalated between layers of $MoS_2$ in the 2H-polymorphic form. The layers may have an average thickness of more than 2, such as from 2 to 10 stacked $MoS_2$ monolayers.

In some embodiments of the sixth aspect, the metallic clusters have an average cluster size of from 1 to 10 nm, or from 1 to 3 nm.

In some embodiments of the sixth aspect, the metallic clusters comprise ruthenium or iron. In some embodiments the metallic clusters comprise ruthenium.

In accordance with a seventh aspect, the invention provides an electrocatalytic composition for the nitrogen reduction reaction, comprising: molybdenum disulphide ($MoS_2$), wherein at least 80 mass % of the $MoS_2$ is present in the 2H-polymorphic form; and a metallic composition dispersed on the $MoS_2$, wherein the metallic composition comprises at least one metal selected from ruthenium, iron, rhodium, iridium and molybdenum, and wherein the metallic composition is at least partially intercalated between layers of $MoS_2$ in the 2H-polymorphic form.

In some embodiments of the seventh aspect, the electrocatalytic composition for the nitrogen reduction reaction comprises: molybdenum disulphide ($MoS_2$), wherein at least 80 mass % of the $MoS_2$ is present in the 2H-polymorphic form; and a metallic composition dispersed on the $MoS_2$, wherein the metallic composition comprises at least one metal selected from ruthenium, iron, rhodium and iridium, and wherein the metallic composition is at least partially intercalated between layers of $MoS_2$ in the 2H-polymorphic form.

In some embodiments of the seventh aspect, the layers have an average thickness of more than 2, such as from 2 to 10 stacked $MoS_2$ monolayers.

In some embodiments of the seventh aspect, the metallic composition is present at least partially in the form of metallic clusters. The metallic clusters may have an average cluster size of from 1 to 10 nm, or from 1 to 3 nm.

In some embodiments of the seventh aspect, the metallic composition comprises ruthenium or iron. In some embodiments the metallic composition comprises ruthenium.

In some embodiments of the sixth and seventh aspects, at least 90 mass %, or at least 95 mass %, or at least 98 mass %, or substantially all of the $MoS_2$ is present in the 2H-polymorphic form.

In some embodiments of the sixth and seventh aspects, the $MoS_2$ is present in particles having an average particle size of between 0.1 μm and 10 μm.

In accordance with an eighth aspect, the invention provides a method of producing an electrocatalytic composition for the nitrogen reduction reaction, the method comprising: contacting an alkali metal-intercalated support material with at least one metal salt selected from a ruthenium salt, an iron salt, a rhodium salt, an iridium salt and a molybdenum salt, wherein the at least one metal salt is reduced to form a metallic composition at least partially intercalated between layers of the support material; and heating the support material to a temperature and for a time sufficient to provide at least 80 mass % of the support material in a semiconductive 2D-crystalline phase having a conduction band minimum energy below (more positive than) −0.3 V relative to the normal hydrogen electrode (NHE).

In some embodiments of the eighth aspect, the method of producing an electrocatalytic composition for the nitrogen reduction reaction comprises: contacting an alkali metal-intercalated support material with at least one metal salt selected from a ruthenium salt, an iron salt, a rhodium salt and an iridium salt, wherein the at least one metal salt is reduced to form a metallic composition at least partially intercalated between layers of the support material; and heating the support material to a temperature and for a time sufficient to provide at least 80 mass % of the support material in a semiconductive 2D-crystalline phase having a conduction band minimum energy below (more positive than) −0.3 V relative to the normal hydrogen electrode (NHE).

In some embodiments of the eighth aspect, the metallic composition comprises metallic clusters.

In some embodiments of the eighth aspect, the alkali metal-intercalated support material is Li-intercalated $MoS_2$.

In some embodiments of the eighth aspect, the temperature is at least 120° C., or at least 140° C., such as at least 150°.

In accordance with a ninth aspect, the invention provides an electrocatalytic composition for the nitrogen reduction reaction, produced by the method of any embodiment of the eighth aspect disclosed herein.

In accordance with a tenth aspect, the invention provides an electrocatalytic composition for the nitrogen reduction reaction, comprising: molybdenum disulphide ($MoS_2$); and metallic molybdenum in contact with the $MoS_2$, wherein at least 80 mass % of the $MoS_2$ is present in the 2H-polymorphic form.

In some embodiments of the tenth aspect, the electrocatalytic composition is formed by partial reduction of $MoS_2$.

In accordance with an eleventh aspect the invention provides a method of reducing dinitrogen to ammonia, the method comprising: contacting an electrocatalytic composition according to any embodiment of fourth, fifth, sixth, seventh or ninth aspects with dinitrogen and an electrolyte comprising a source of hydrogen; and applying a potential at the electrocatalytic composition sufficient to reduce the dinitrogen and the source of hydrogen on the electrocatalytic composition to form ammonia.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Figure 1:
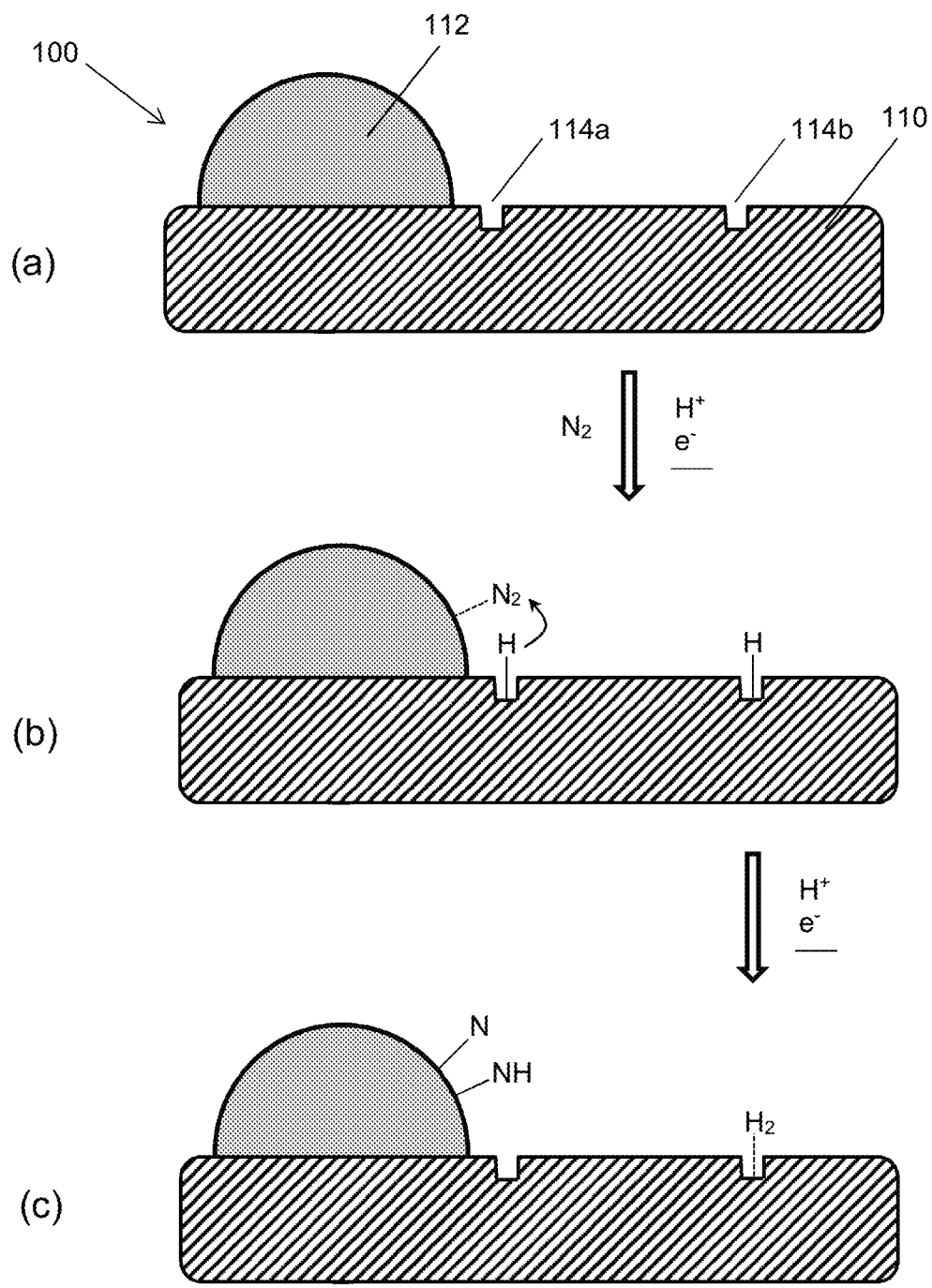
FIG. 1 schematically depicts reactions believed to be occurring under nitrogen reduction reaction conditions on an electrocatalytic composition according to the invention.

The present invention relates to electrocatalytic compositions for the nitrogen reduction reaction, and also to methods of producing such compositions, to electrodes comprising such compositions, and to electrochemical cells and methods of reducing dinitrogen in which cathodes comprising such compositions are used. The electrocatalytic compositions generally comprise a solid support material present in one or more crystalline phases. A metallic composition comprising ruthenium, iron, rhodium, iridium or molybdenum, preferably in the form of metallic clusters, is dispersed on the support material. At least 80 mass % of the support material is present in a semiconductive phase having a conduction band minimum energy below (i.e. more positive than) −0.3 V, and preferably below 0 V, relative to the normal hydrogen electrode (NHE).

Both the nitrogen reduction reaction of equation (1) and the hydrogen evolution reaction of equation (2) are thought to involve an initial electrochemical reduction of $H^+$ (or other reducible source of hydrogen, such as $H_2O$) at a heterogeneous catalytic site. This reaction step, known as the Volmer reaction, is shown in equations (3) and (4) for acidic and basic media respectively:

$$H^+ + M^* + e^- \rightarrow M^*-H \qquad (3)$$

$$H_2O + M^* + e^- \rightarrow M^*-H + OH^- \qquad (4)$$

where M* denotes the active site on the electrocatalytic composition.

A phase of the support material with at least semiconductivity is thus required to permit the charge transfer necessary for reductive formation of adsorbed hydrogen (i.e. M*–H). The challenge, then, is allowing binding and reduction of $N_2$ with the adsorbed hydrogen to be competitive with $H_2$-forming reactions, and particularly the Heyrovsky reaction believed to be the principle mechanism of $H_2$ formation at ambient temperatures. This reaction is shown in equations (5) and (6) for acidic and basic media respectively:

$$H^+ + M^*-H + e^- \rightarrow M^* + H_2 \qquad (5)$$

$$H_2O + M^*-H + e^- \rightarrow M^* + H_2 + OH^- \qquad (6)$$

Without wishing to be bound by any theory, the inventors believe that the advantageous selectivity and activity for ammonia formation on the electrocatalytic compositions of the invention may be driven by a synergistic interaction between active sites, on both the metallic clusters and on a semi-conductive support phase which has suitably low conduction band minimum energy. This is empirically supported by the inventors' observation of improved NRR performance obtained with a composition according to the invention, compared with that obtained when using either the equivalent metallic nanoparticles or the support material in isolation.

$N_2$ binding and subsequent reduction by adsorbed hydrogen is believed, on the basis of theoretical studies, to occur particularly favourably on Ru, Fe, Rh, Ir and Mo metallic surfaces (see for example Norskov et al; *Phys Chem Chem Phys.* 2012 14(3) 1235-45). Ru and Fe metals are also preferred in heterogeneous catalysts for the Haber-Bosch process. The Volmer reduction of $H^+$ (or other hydrogen source) to form adsorbed hydrogen may occur at least in part at nearby sites on the support material, such that the adsorbed hydrogen can readily be transferred directly to the cluster-bound $N_2$. The selection of a semiconductor support having a low conduction band minimum energy—specifically, below (i.e. more positive than) −0.3 V, and preferably below 0 V, relative to the normal hydrogen electrode (NHE)—is related to a proposed effect of the semiconductor conduction band energy on the HER. On a semiconductor, a reduction reaction can only take place when the externally applied potential has the effect of creating a potential difference between the bulk of the semiconductor and the reducible species (protons in the case of the HER) in solution, such that electrons can flow to reduce the species. If the conduction band energy level is very negative on the NHE scale, electrons can flow readily to reduce protons, and the HER will not be limited by electron supply. When the conduction band energy level is more positive than −0.3 V vs NHE, electrons cannot readily flow into the HER. When the conduction band energy level becomes distinctly positive of NHE (i.e. more positive than 0 V vs NHE), very little electron current can flow into the HER, i.e. an additional overpotential is required to switch on this electron flow. The proposed role of the semiconductor then is to limit the supply of electrons flowing into HER and thereby significantly lower the rate of this undesirable competing reaction. By thereby limiting the supply of electrons a larger fraction of current can flow into the NRR, which is usually slower than HER, with the effect of improving the faradaic efficiency of the NRR process.

Moreover, in at least some embodiments of the invention, the morphology of the electrocatalytic composition may further contribute to the favourable ammonia selectivity. The preponderance of small metallic clusters dispersed over the support increases the relative abundance of hydrogen-reduction active sites in close proximity to a cluster/support interface, compared with isolated sites where adsorbed hydrogen is more susceptible to $H_2$ formation. Furthermore, in embodiments where the semiconductive crystalline phase is a two-dimensional (2D) material comprising stacked 2D-crystalline monolayers (or nanosheets), the metallic composition may be at least partially intercalated between adjacent layers of the stacked monolayers, providing further advantages described in greater detail hereafter.

Given the inherent rate advantage of the two-electron HER compared to the six-electron NRR, the inventors have found it important that the crystalline support material includes low, and preferably negligible, amounts of any metallic phases or semiconductive phases with high conduction band minimum energies. Such phases may allow facile electrochemical reduction of adsorbed hydrogen by energetic electrons, such that a substantial presence of such phases produces an unacceptable swing in selectivity from NRR towards HER. Accordingly, at least 80 mass %, and ideally substantially all of the support material on which the metallic composition is dispersed is present in a semiconductive phase having a conduction band minimum energy below (i.e. more positive than) −0.3 V, and preferably less than 0 V, relative to the normal hydrogen electrode (NHE).

Although the invention is not to be limited in any way by the theory outlined above, the relevant principles may be more clearly understood by referring to FIG. 1, which schematically depicts electrocatalytic composition 100 according to the invention. As seen in FIG. 1(*a*), electrocatalytic composition 100 comprises solid support material 110, present in a semiconductive phase having a conduction band minimum energy below (i.e. more positive than) −0.3 V relative to the normal hydrogen electrode (NHE). Ruthenium (or iron, rhodium, iridium or molybdenum) metallic clusters 112 are dispersed on support material 110. Catalytic sites 114*a* and 114*b* are present on the support material surface.

In one mode of reaction, under electrocatalytic reaction conditions, composition 100 is contacted with an electrolyte comprising dinitrogen and a source of hydrogen, and a potential is applied to the electrocatalytic composition. As seen in FIG. 1(*b*), dinitrogen binds reversibly to the metallic cluster, while $H^+$ is electrochemically reduced with electrons conducted through semiconductive support material 110, via the Volmer reaction, to form absorbed hydrogen at catalytic sites 114*a* and 114*b*. However, the rate of proton-reduction reactions, and particularly those resulting in $H_2$ formation, is suppressed due to the low conduction band minimum energy of the predominant semiconductive phase of support material 110.

Due to the proximity of catalytic site 114*a* to metallic cluster 112, reduced hydrogen adsorbed at site 114*a* transfers to and reacts with the bound $N_2$ molecule. As depicted in FIG. 1(*c*), $N_2$ reacts dissociatively to form adsorbed M*≡N and M*=NH species. However, it is believed that $N_2$ may instead (or also) react associatively to form M*-N=NH. In either case, further reaction with adsorbed hydrogen species ultimately produces ammonia according to equation (1).

By contrast, isolated catalytic site 114*b* is remote from active sites capable of binding $N_2$. Accordingly, the adsorbed hydrogen formed at this site is more susceptible to further electrochemical reactions resulting in the formation and desorption of $H_2$, as also seen in FIG. 1(*c*).

In an alternative mechanism that may be operable, the dinitrogen binds reversibly to the metallic cluster and is reduced in a first step to M*-N=N$^-$. In the second step $H^+$ from the electrolyte adds to this anionic species to form M-N=NH. Further steps of electron and proton addition followed by dissociation lead to the production of a first and then a second molecule of ammonia. In this mechanism the role of the support is to provide a limited supply of electrons to the metallic cluster, while at the same time providing a surface that in its exposed areas is otherwise a poor HER catalyst (as demonstrated herein).

Support Material

The electrocatalytic composition comprises a support material present in one or more crystalline phases, with at least 80 mass % of the support material present in a semiconductive crystalline phase having a conduction band minimum energy below (more positive than) −0.3 V relative to the normal hydrogen electrode (NHE). In some embodiments at least 90 mass %, or at least 95 mass %, or at least 98 mass % of the support material is present in the suitable semiconductive crystalline phase. Most preferably, substantially all of the support material is present in the suitable semiconductive crystalline phase. As used herein, "substantially all" means that any other phases, if present, are below detectable limits using a suitable technique such as Raman spectroscopy.

Consistent with the principles disclosed herein, the support material may generally be any material capable of forming an electrochemically stable crystalline phase with a conduction band minimum energy below −0.3 V, and preferably below 0 V, relative to the normal hydrogen electrode (NHE). Crystalline semiconductive materials may be either intrinsic (undoped) or extrinsic (doped) semiconductors. In some embodiments, the support material is an intrinsic semiconductor. The support material may thus be a binary or ternary chemical compound or other composition having a substantially uniform configuration of constituent elements throughout its lattice structure. However, it will be appreciated that surfaces, edges and crystalline defects such as lattice vacancies may cause the support material to have an actual elemental composition which deviates significantly from the ideal stoichiometry of its constituent crystalline phase, particularly when the support material is present in the form of small particles. In some embodiments, such defect sites may indeed be important to provide active catalytic sites on the support material.

The support material should be sufficiently electrochemically stable to allow nitrogen reduction reaction to take place. Thus it should be thermodynamically irreducible, or only slowly reducible due to kinetic restrictions, by electrons flowing through the electrocatalytic composition under conditions suitable to electrochemically reduce dinitrogen. Furthermore, the support material should be sufficiently chemically stable, for example against degradation in the presence of aqueous electrolyte compositions.

In some embodiments, the support material comprises a transition metal oxide or chalcogenide. In some embodiments, the support material comprises a transition metal oxide or sulphide, such as a transition metal sulphide.

In non-metallic crystalline solids, a band gap exists between the valence band (i.e. the highest energy band having electrons present at absolute zero temperature) and the conduction band (i.e. the lowest band lacking electrons at absolute zero temperature). In insulating materials, the band gap is large enough at ambient temperatures that the valence band remains full and the conduction band empty. In semiconductors, however, the band gap is small enough that some valence electrons are promoted to the conduction band at ambient temperatures. As a result of the partially filled bands, the material becomes electrically conductive.

The energies of the valence and conduction bands of semiconductors may usefully be considered with reference to the standard potentials of the redox reactions occurring during electrolysis of water. The standard cathodic reduction potential, i.e. of the $H_2/H^+$ redox couple during the hydrogen evolution reaction, is commonly defined as 0 V for the normal hydrogen electrode (NHE; a platinum electrode in 1M acid electrolyte, i.e. at pH≈0). The standard anodic oxidation potential, i.e. of the $O_2/H_2O$ redox couple during the oxygen evolution reaction, is then +1.23 V relative to the NHE. Conduction band energies may also be expressed as absolute potentials, with reference to the potential of an electron at rest in a vacuum. The NHE has an absolute potential of c.a. −4.44 V on this scale.

Figure 2:
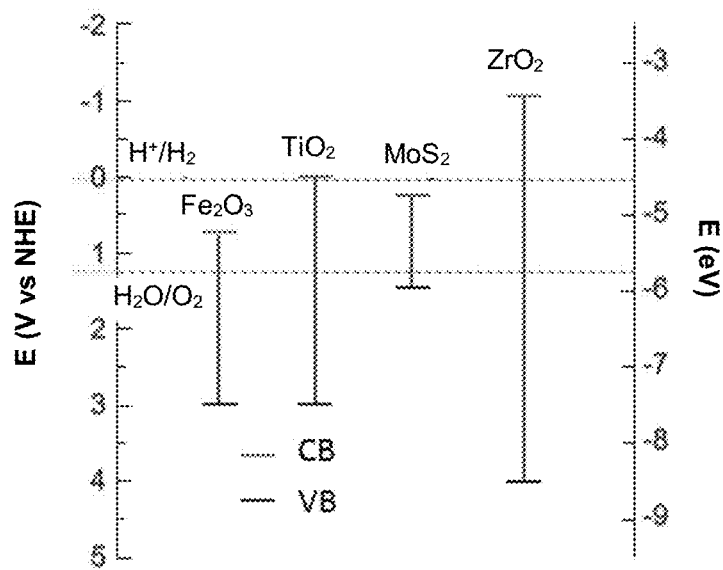
FIG. 2 is a plot of the valence band maximum energy and the conduction band minimum energy of selected semiconductors.

FIG. 2 depicts a plot of the valence bands and conduction bands of selected semiconductors, including $Fe_2O_3$, bulk phase (i.e. multilayer) $2H-MoS_2$, rutile-$TiO_2$ and $ZrO_2$. It may be seen that $Fe_2O_3$ and bulk phase $WS_2$ have conduction band minimum energies below the NHE, i.e. more positive than 0 V relative to the NHE. Accordingly, each of these materials is a particularly suitable support for the electrocatalytic compositions of the invention, as has been verified experimentally. Rutile titanium dioxide has a conduction band minimum energy of just above 0 V, but still below the −0.3 V threshold. This material is thus also a suitable support, as also verified experimentally. By contrast, $ZrO_2$ has a conduction band minimum energy of −1.03 V relative to the NHE; $ZrO_2$ is thus not a suitable semiconductive support material according to the invention.

Conduction band minimum energies for a wide variety of semiconductive materials have been reported. Selected examples of support materials believed to have acceptably stable semiconductive crystalline bulk phases with a conduction band minimum energy below −0.3 V, and typically below 0 V, relative to the normal hydrogen electrode (NHE) are listed in Table 1 below.

TABLE 1

| Support material | Crystalline phase | Lattice structure (bulk phase) | Reported conduction band minimum energy (negative eV vs vac) | Reported conduction band minimum energy (eV vs NHE) | Ref# |
|---|---|---|---|---|---|
| $MoS_2$ | H phase | Stacks of 2D nanosheets, each comprising a Mo layer between two S layers | | 0.25, 0.29 | (1) |
| $WS_2$ | H phase | Stacks of 2D nanosheets, each comprising a Mo layer between two Se layers | | 0.42 | (1) |
| $ZrS_2$ | T-phase | Stacks of 2D nanosheets, each comprising a Zr layer between two S layers | 5.3 | 0.86 | (2) |
| $ZrSe_2$ | T-phase | Stacks of 2D nanosheets, each comprising a Zr layer between two Se layers | 5.15 | 0.71 | (2) |
| $HfS_2$ | T-phase | Stacks of 2D nanosheets, each comprising a Hf layer between two S layers | 5.71 | 1.27 | (2) |
| $HfSe_2$ | T-phase | Stacks of 2D nanosheets, each comprising a Hf layer between two Se layers | 5.37 | 0.93 | (2) |
| $SnS_2$ | T-phase | Stacks of 2D nanosheets, each comprising a Sn layer between two S layers | 5.46 | 1.02 | (2) |
| $SnSe_2$ | T-phase | Stacks of 2D nanosheets, each comprising a Sn layer between two Se layers | 5.22 | 0.78 | (2) |
| $VSe_2$ | H-phase | Stacks of 2D nanosheets, each comprising a V layer between two Se layers | 5.33 | 0.89 | (2) |
| $VTe_2$ | H-phase | Stacks of 2D nanosheets, each comprising a V layer between two Te layers | 4.83 | 0.39 | (2) |
| ZnO | | Nanoparticles | 4.19 | −0.25 | (1) |
| $TiO_2$ (dark) | rutile | Nanoparticles | 4.44 | 0 | (3) |
| $TiO_2$ (illuminated) | rutile | Nanoparticles | 4.75 | 0.31 | (3) |
| $WO_3$ | | Nanoparticles | 5.24 | 0.8 | (1) |
| $MoO_3$ | | Nanoparticles | 5.4 | 0.96 | (4) |
| $SnO_2$ | rutile | Nanoparticles | 4.5 | 0.06 | (1) |
| $Fe_2O_3$ | | Nanoparticles | 4.78 | 0.34 | (1) |

TABLE 1-continued

| Support material | Crystal- line phase | Lattice structure (bulk phase) | Reported conduction band minimum energy (negative eV vs vac) | Reported conduction band minimum energy (eV vs NHE) | Ref# |
|---|---|---|---|---|---|
| $V_2O_5$ | | Nanoparticles | 4.7 | 0.26 | (1) |
| $Bi_2O_3$ | | Nanoparticles | 4.83 | 0.39 | (1) |

References#:
(1) Schoonen et al, American Mineralogist, 2000, 85, pages 543-556;
(2) Chenxi Zhang et al 2D Mater. 2017 4 015026
(3) Memming, R. Semiconductor Electrochemistry (Wiley VCH)
(4) Fu et al, Nanoscale 2012,4, 2187-2201

In some embodiments, the support material comprises at least one selected from molybdenum disulphide ($MoS_2$), ferric oxide ($Fe_2O_3$) and titanium dioxide ($TiO_2$).

In some embodiments, the semiconductive phase of the support material is a two-dimensional (2D) material, i.e. a material comprising planar crystalline monolayers having a thickness of a single atom or molecular unit (for 2D allotropes and compounds respectively). Such materials are commonly arranged in a multilayer configuration (referred to herein as a "bulk phase") consisting of a stack of adjacent monolayers bound together by van der Waals forces. Some 2D materials may however be exfoliated to separate the monolayers, in certain cases thereby producing isolated monolayers.

In some embodiments, the semiconductive 2D support material comprises a transition metal dichalcogenide, for example molybdenum disulphide ($MoS_2$) or tungsten disulphide ($WS_2$), and preferably $MoS_2$. Bulk phase $MoS_2$ in the thermodynamically stable 2H polymorphic form comprises stacked crystalline monolayers, where each crystalline monolayer consists of a layer of Mo atoms sandwiched between layers of S atoms, as depicted in FIG. 6.

Apart from their favourable electronic properties, semiconductive 2D materials, such as $MoS_2$ and $WS_2$, provide the additional feature that metallic compositions such as the Ru, Fe, Rh, Ir or Mo metallic clusters of the invention may be intercalated between adjacent semiconductive layers of the support material, where each layer comprises one or more stacked 2D monolayers. Such intercalation is believed to provide further advantages, for example protection against deactivation during extended reactions and high electrochemically accessible surface area. Furthermore, it has been proposed that surface defects on semiconductive 2D materials, and in particular S-vacancies on transition metal dichalogenides such as $MoS_2$, are possible catalytic sites for proton reduction reactions. Without wishing to be bound by any theory, the inventors believe that such defect sites may be prevalent on metal-intercalated semiconductive 2D materials according to the invention. This is empirically supported by measured S:Mo atomic ratios of c.a. 1.65 on the surface of Ru-cluster intercalated $MoS_2$ compositions, below the ratio of 2 expected for pristine bulk phase $MoS_2$.

Figure 6:
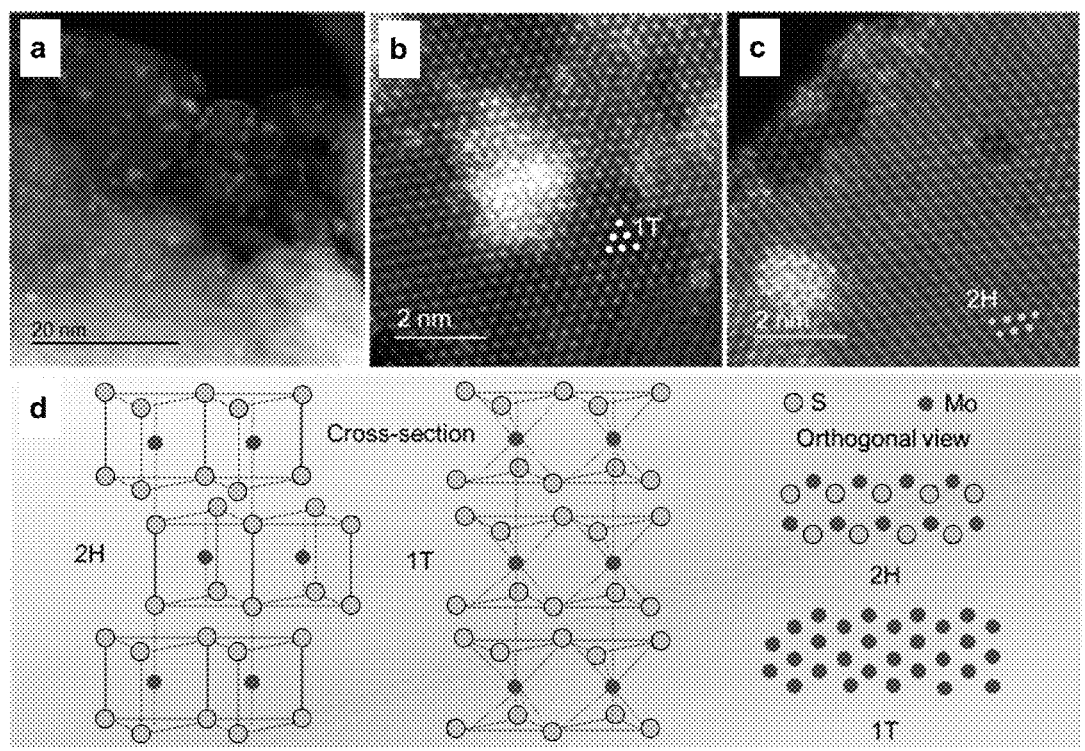
FIG. 6 depicts high angle annular dark field (HAADF) scanning transmission electron microscopy images of Ru-intercalated $MoS_2$ samples 1-2 and 1-3 prepared in example 1, and schematic depictions of the crystallographic structures of 1T-$MoS_2$ and 2H-$MoS_2$ polymorphic phases.

However, the process of intercalation can produce a transition of semiconductive 2H-$MoS_2$ (or 2H—$WS_2$) to the metallic 1T polymorphic form (also schematically depicted in FIG. 6). The inventors have found that excessive amounts of residual 1T polymorphic form in the electrocatalytic composition is detrimental to the nitrogen reduction reaction performance, according to the principles discussed herein.

Therefore it is important that a high degree of reversion, preferably quantitative reversion, to the semiconductive 2H phase is produced when intercalated support materials are used in the NRR. The inventors have developed a method that provides this outcome, as will be described in greater detail hereafter.

Furthermore, the band structure of semiconductive two-dimensional (2D) materials may depend on the number of stacked monolayers present in the material. Thus, isolated 2H-$MoS_2$ monolayers have larger band gaps and higher (more negative) conduction band minimum energies than the bulk phase (multilayer) 2H-$MoS_2$. The increase in conduction band minimum energy caused by exfoliation of some other transition metal dichalcogenides (including 2H—$WS_2$) is believed to be even more pronounced. An excessive degree of exfoliation or other disruption (such as by intercalation) of the stacked monolayers in a 2D support material may therefore produce an undesirably high conduction band minimum energy, resulting in a loss of NRR performance. In some embodiments, therefore, the semiconductive 2D crystalline phase comprises undisrupted stacks of 2D monolayers having an average thickness of 2 or more, such as from 2 to 10 (or 2 to 4), monolayers. For the case where the support material is intercalated, therefore, the metallic clusters may be intercalated between two adjacent layers, each comprising an undisrupted stack of 2D monolayers with an average thickness of 2 or more, such as from 2 to 10 (or 2 to 4), monolayers.

In some embodiments, the support material is present in particles, such as particles with an average particle size of between 10 nm and 10 μm. Such particulate electrocatalytic compositions may provide effective mass transfer and efficient usage of catalyst materials, and may be conveniently immobilised on the conductive substrate of an electrode, as will be described in greater detail hereafter. Where a 2D-material is used, for example an intercalated material, the particle size may be between 0.1 μm and 10 μm, since electrochemically accessible catalytic sites may be present within the particles.

Metallic Compositions

The electrocatalytic compositions of the invention comprise a metallic composition, preferably in the form of metallic clusters, dispersed on the support material. As used herein, a metallic composition comprises metal atoms at least predominantly, and preferably substantially entirely, in the zero oxidation state. The metallic composition comprises at least one metal selected from ruthenium, iron, rhodium, iridium or molybdenum. Previously reported theoretical calculations indicate that these metals intrinsically (i.e. not when supported on semi-conductors) provide the most favourable NRR reactivity. In some embodiments, the metallic composition comprises at least one metal selected from ruthenium, iron, rhodium and iridium, for example selected from ruthenium and iron. The inventors have found that ruthenium clusters provide the best intrinsic performance for NRR, as well as stability in the presence of acidic electrolytes. Iron clusters, however, were also found to afford acceptable NRR performance, particularly in alkaline electrolytes, and in addition may provide lower cost electrocatalytic compositions. Molybdenum metallic compositions in intimate contact with suitable semi-conductive support materials may advantageously be produced by partial reduction of a molybdenum-containing support such as $MoS_2$.

The metallic clusters, or nanoparticles, may suitably be amorphous or crystalline, and may have an average cluster size of from 1 to 10 nm, such as from 1 to 3 nm. As already disclosed herein, electrocatalytic compositions comprising a large number of small clusters dispersed on the support material surface may advantageously provide a high abundance of catalytic sites, or assemblies of cooperating sites, close to the cluster-support interface. Metallic clusters are, however, preferred over isolated monoatomic Ru(0) or Fe(0) adatoms (or dopants), since the binding and subsequent reduction of $N_2$ is believed to occur favourably on metallic surfaces. As an example, the inventors have found in one experiment that amorphous ruthenium clusters with a diameter of about 2 nm, dispersed on 2H-$MoS_2$, provide excellent performance in the NRR.

The metallic composition may be present in any suitable amount to provide acceptable NRR performance, and preferably to aggregate as clusters. In some embodiments, the metallic composition is present in an amount of between 0.1 mass % and 20 mass %, or between 1 mass % and 10 mass %, such as between 3 mass % and 6 mass % of the electrocatalytic composition.

The metallic composition dispersed on the support may suitably be present only on the external surface of particles of the support material, or at least partially as intercalants in the interlayers of 2D support materials. For example, the inventors have found that ruthenium clusters supported on the surface of $Fe_2O_3$, or ruthenium clusters intercalated between layers of 2H-$MoS_2$, are both effective electrocatalytic compositions for the NRR.

In some embodiments, as already disclosed herein, the metallic composition is at least partially intercalated between layers of a 2D-crystalline phase, such as 2H-$MoS_2$. Intercalated metallic compositions may be more stable against degradation under electrocatalytic conditions and may provide a high electrochemically available surface area within particles of the electrocatalytic composition.

Methods of Producing an Electrocatalytic Composition

The invention also provides methods of producing electrocatalytic compositions suitable for the nitrogen reduction reaction. In the most general form, the electrocatalytic compositions disclosed herein require only a Ru, Fe, Rh, Ir or Mo metallic composition, preferably present as clusters, dispersed on a support material at least 80 mass % (and preferably entirely) present in a semiconductive 2D-crystalline phase having a conduction band minimum energy below $-0.3$ V relative to the NHE.

As such, a variety of methods may be employed to prepare these materials. For example, a ruthenium, iron, rhodium, iridium or molybdenum salt may be chemically or electrochemically reduced in the presence of a particulate support material already having the required phase properties, leading directly to supportation of a dispersed metallic composition on the particle surfaces.

The invention provides, in particular, a method for producing an electrocatalytic composition according to certain embodiments of the invention, in which the electrocatalytic composition comprises a support material at least 80 mass % (and preferably entirely) present in a semiconductive 2D-crystalline phase having a conduction band minimum energy below $-0.3$ V relative to the NHE, and an Ru, Fe, Rh, Ir or Mo metallic composition (preferably present as clusters) at least partially intercalated between stacked layers of the semiconductive 2D-crystalline phase.

This method comprises contacting an alkali metal-intercalated support material with at least one metal salt selected from a ruthenium salt, an iron salt, a rhodium salt, an iridium salt and a molybdenum salt, thereby reducing the metal salt to form a metallic composition at least partially intercalated between stacked layers of the support material, and heating the support material to a temperature and for a time sufficient to provide at least 80 mass %, and preferably substantially all, of the material in a semiconductive 2D-crystalline phase having a conduction band minimum energy below $-0.3$ V relative to the NHE.

Alkali metal-intercalated 2D materials such as Li—$MoS_2$ and Li—$WS_2$ have previously been reported, prepared by treating $MoS_2$ or $WS_2$ powders with chemical lithiating agents such as butyl lithium, or by electrochemical intercalation with lithium metal reduced in situ from lithium salts in solution. Alkali metal intercalation of 2H-$MoS_2$ or 2H—$WS_2$ produces a phase transformation to the metallic 1T polymorph. The reaction of Li—$MoS_2$ with metal salts to form intercalated metallic clusters has also previously been reported (Chen et al, *Nature Communications* 2017, 8, 14548). In this report, reaction between Li—$MoS_2$ and $RuCl_3$ was conducted in an inert solvent at 80° C. for 48 hours. The resultant catalyst composition was found to be a potent hydrogen evolution reaction electrocatalyst, with onset potential of 38 mV and a Tafel slope of 61 mV·$dec^{-1}$.

The inventors have replicated the reported synthesis of this Ru—$MoS_2$ material, and demonstrated that at least approximately 30% of the $MoS_2$ remains in the 1T polymorphic phase, even after 72 hours of reaction at 80° C. Electrochemical evaluation demonstrated an HER onset potential of 49 mV and a Tafel slope of 66 mV $dec^{-1}$. The metallic 1T phase is known to be highly active for the HER, and is therefore believed to be responsible for the observed HER activity of the reported intercalated Ru—$MoS_2$ composition.

Accordingly, the presently disclosed method requires an additional element of heating the support material to a temperature, and for a time, sufficient to provide at least 80 mass % of the support material in a semiconductive 2D-crystalline phase having a conduction band minimum energy below $-0.3$ V relative to the NHE. Preferably the temperature and time is sufficient to provide at least 90 mass %, or at least 95 mass %, or at least 98 mass %, and most preferably substantially all of the support material in the required semiconductive crystalline phase.

Without wishing to be bound by any theory, the inventors believe that the heating step may in some embodiments also cause exfoliated monolayers of the 2D-material to re-stack in closer alignment, thus reducing the band gap and the conduction band minimum energy. As already disclosed herein, the bulk phase (multilayer configuration) of certain 2D materials, such as transition metal dicholcogenides, has a narrower band gap than the isolated monolayers. The re-stacking of monolayers, which may for example have been partially exfoliated during intercalation, into a multi-layered configuration may thus increase the content of 2D-crystalline support phase with a conduction band minimum energy below $-0.3$ V, or below 0 V.

In some embodiments, the heating is applied in a step subsequent to the initial reaction, at lower temperature, between the alkali metal-intercalated support material and the metal (Ru, Fe, Rh, Ir or Mo) salt. However, it will be appreciated that the alkali metal-intercalated support material and the metal salt may instead be contacted at a suitably high temperature, and then allowed to react at this temperature for a period of time sufficient to ensure that the support material has converted to the necessary phase composition or stacked configuration.

In some embodiments, the heating temperature is at least 120° C., or at least 140° C., such as about 150° C. In the specific case of Ru-intercalated $MoS_2$, the inventors have found that complete reversion of the 1T phase to the desired 2H phase occurred within 12 hours at 150° C. However, it will be appreciated that the minimum required temperature and time may depend on the nature of the support material and the intercalating metallic composition. The skilled person, with the benefit of this disclosure, is able to determine suitable conditions for a given implementation of the invention with no more than routine optimisation.

Cathodes

The invention also provides a cathode suitable for the nitrogen reduction reaction, for example when used in an electrochemical cell. The cathode comprises an electrocatalytic composition, as disclosed herein, on an electrically conductive substrate which is connectable to a power supply. The electrocatalytic composition is in electrical communication with the substrate, such that current can flow from an external circuit via the substrate to the electrocatalytic composition, there providing the electrons necessary for electrochemical reduction reactions.

Suitable conductive substrates are known to those skilled in the art, and include metallic substrates and carbon substrates such as glassy carbon, carbon fiber paper and the like. The electrocatalytic composition may be directly bonded to the substrate. However, in some embodiments the composition is adhered to the substrate with a binder, for example a proton-conductive polymer such as Nafion. The inventors have found that sufficient conductivity between substrate and electrocatalytic composition may be obtained without the use of a conductive additive such an electron-conducting polymer, and in some embodiments the cathode may be substantially free of an electron-conducting polymer.

Electrochemical Cells

The invention also provides an electrochemical cell for reduction of dinitrogen to ammonia. The cell includes a cathode comprising an electrocatalytic composition as disclosed herein, an anode, a feed inlet to the cell to convey dinitrogen for reduction on the electrocatalytic composition; and a power supply connected to the cathode and the anode. The power supply is capable of providing a potential at the cathode sufficient to reduce dinitrogen on the electrocatalytic composition when the cathode is in contact with dinitrogen and an electrolyte comprising a source of hydrogen.

The cell is capable of containing an electrolyte, in contact with the cathode, which contains a source of hydrogen such as $H^+$ (in acidic electrolytes) or $H_2O$ (in alkaline electrolytes). The feed port is configured to feed dinitrogen for reaction at the cathode, for example by bubbling $N_2$ into the electrolyte close to or through the cathode.

The cell may be configured such that the anode and cathode are in contact with the same electrolyte. Alternatively, the cell comprises cathodic and anodic chambers, capable of containing different electrolytes, and connected by a salt bridge to allow ionic transfer and thus the maintenance of charge neutrality.

The anode is not considered to be particularly limited, and suitable anodes for electrochemical reduction reactions are known to those skilled in the art. In some embodiments, the anode is capable of oxidising a hydrogen-containing species, such as $H_2O$ or $H_2$, to produce the source of hydrogen (such as $H^+$) for consumption at the cathode and to maintain charge neutrality in the electrolyte.

The cell may further comprise an outlet for removing ammonia, either as a gas in the form of $NH_3$ or as a liquid containing ammonium ions ($NH_4^+$). It will be appreciated that the form of the ammonia removed from the cell will depend on the nature of the electrolyte used.

In some embodiments, the cell is configured to remove the ammonia product from the exiting gas stream and the remaining $N_2$ and $H_2$ is recirculated to the cathode inlet along with an amount of make-up $N_2$.

In some embodiments, the cell is configured to recycle $H_2$ produced at the cathode for oxidation to $H^+$ at the anode. In this manner, $H_2$ co-produced with ammonia is recycled back into the process. This results in reduced energy consumption per unit of ammonia produced as there is no other energy containing by-product.

The electrochemical cell generally comprises a body configured to retain the electrolyte(s). In some embodiments, the body is pressure resistant, such that an elevated partial pressure of $N_2$ gas in contact with the cathodic electrolyte may be provided. Pressures up to 100 bar are envisaged. The cell may also be provided with other conventional equipment, such as heaters for maintaining a desired reaction temperature.

The power supply may be any conventional power supply for electrolysis systems, such as a direct current power source. Optionally, the power supply may include a photovoltaic solar cell. It is considered a particular advantage of the present invention that ammonia may be produced from electrical power, and particularly renewable power. For example, it is envisaged that the invention may allow ammonia-based fertilizers to be produced at the point of need using solar or wind-generated power; this may be particularly valuable for high value agricultural applications such as hydroponics, or to minimise logistical challenges associated with fertilizer transport to remote areas.

In one embodiment of a point of use fertiliser generating cell, the exiting gas stream is passed through a solution of sulphuric or phosphoric acid in water to absorb the ammonia as ammonium. The product of this process is a solution of the ammonium salt of the acid used, for example ammonium sulphate solution, and can be applied directly as a fertilising solution. In the case of hydroponic or commercial greenhouse use, the cell can be controlled to continuously provide a supply of fertiliser in-line in the water supply to the plants. Alternatively, the cell electrolyte itself contains the sulphuric or phosphoric acid and the electrolyte is slowly replaced in a continuous fashion to deliver the ammonium salt solution for use as a fertiliser solution.

Figure 3:
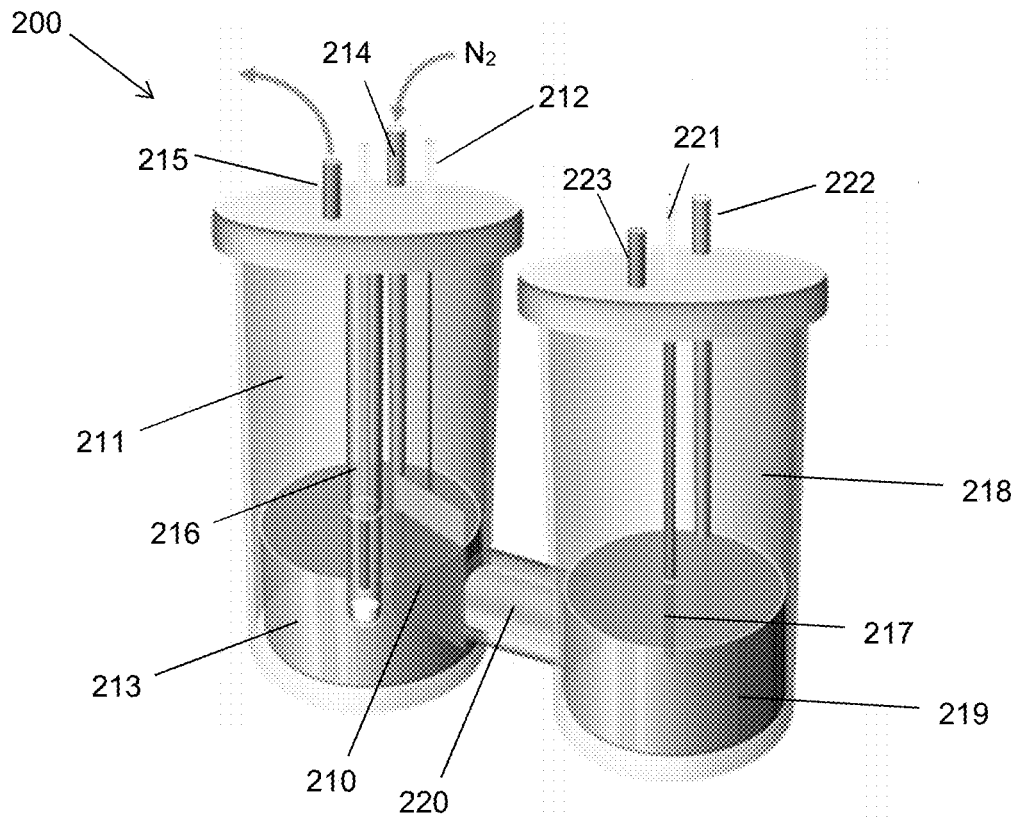
FIG. 3 depicts an electrochemical cell according to an embodiment of the invention.

An example of an electrochemical cell for the NRR is depicted in FIG. 3. Cell 200 includes cathode 210, comprising a conductive substrate with the electrocatalytic composition of the invention disposed thereon, in cathodic chamber 211. Cathode 210 is equipped with electrical connection point 212 for connection to a power supply (not shown). Cathode 210 is immersed in electrolyte 213, which comprises a reducible source of hydrogen. Cell 200 further comprises feed inlet 214, which provides bubbling $N_2$ flow into electrolyte 213 near to cathode 210, and gas outlet 215 for removing gas from the headspace of the cathodic chamber. In the case where ammonia is produced as gaseous $NH_3$, the ammonia product of NRR may be removed from the cell through outlet 215. Optionally, cell 200 comprises reference electrode 216, such as a reversible hydrogen electrode, against which the potential at cathode 210 can be measured.

Cell 200 further comprises anode 217 in anodic chamber 218. Anode 217 is immersed in electrolyte 219, which may be the same as or different from electrolyte 213. If different, a salt bridge may be provided at junction 220 between the cathodic and anodic chambers. Cathode 210 is equipped with electrical connection point 221 for connection to the power supply (not shown). A gas inlet port 222 is optionally provided in anodic chamber 218 to allow a gas to be fed into electrolyte 219, such as $H_2$ for oxidation at the anode or an inert gas such as $N_2$. Optional gas outlet port 223 provides for removal of gas from the headspace of the anodic chamber.

Methods of Reducing Dinitrogen to Ammonia

The invention also provides methods of reducing dinitrogen to ammonia. The methods comprise contacting an electrocatalytic composition, as disclosed herein, with dinitrogen and an electrolyte comprising a source of hydrogen, and applying a potential at the electrocatalytic composition sufficient to reduce the dinitrogen and the source of hydrogen on the electrocatalytic composition to from ammonia. The source of hydrogen may, for example, be $H^+$ and/or $H_2O$. The methods typically utilise the electrocatalytic compositions of the invention on a cathode as disclosed herein. Moreover, the methods are generally performed in an electrochemical cell as also disclosed herein.

The methods of the invention may involve a step of recovering ammonia product. It will be appreciated that the ammonia, in the form ultimately recovered by implementing the method, may be either gaseous ammonia ($NH_3$) or ammonium ions ($NH_4^+$), and that this may depend on the nature of the electrolyte. The production and recovery of ammonia in either of these forms falls within the scope of the invention.

The potential applied at the electrocatalytic composition may be in the range of $-50$ mV to $-500$ mV, or $-100$ to $-250$ mV, relative to the reversible hydrogen electrode (RHE). In some embodiments, the potential is below the onset potential of the hydrogen evolution reaction, as measured in a linear sweep voltammetry experiment conducted in the electrolyte at a scan rate of 5 mV s$^{-1}$. As one example, the inventors have found that superior $N_2$ selectivity is obtained with a electrocatalytic composition comprising Ru clusters supported on 2H-$MoS_2$ when the applied potential is below $-187$ mV vs RHE, which is the onset potential of the HER with this composition.

The electrolyte may generally be any suitable electrolyte for electrochemical reactions, including liquid and gel electrolytes. In some embodiments, the electrolyte is an aqueous electrolyte, for example having a pH in the range of 0 to 14. In some embodiments, the electrolyte is an acidic electrolyte, for example a solution of a mineral acid such as HCl.

In some embodiments, the electrolyte comprises an aprotic liquid, such as an ionic liquid. Suitable ionic liquids and aprotic liquid electrolytes include those disclosed in the applicant's co-pending application PCT/AU2017/000036, which is hereby incorporated by reference. These disclosed aprotic liquid-based electrolytes were found to provide improvements in faradaic efficiency for the NRR, believed to be due to the high $N_2$ solubility and the reduced concentration of water in the electrolyte.

Thus, in some embodiments, the electrolyte comprises an ionic liquid including:

(i) a cation selected from the group consisting of $PR_{1-4}$ (phosphonium), $NR_{1-4}$(tetra alkylammonium), $C_4H_8NR_2$ (pyrrolidinium), wherein each R group is independently linear, branched or cyclic and preferably comprises from 1 to 18 carbon atoms, optionally partially or completely halogenated, optionally including a heteroatom, optionally including a functional group preferably chosen from ethers, alcohols, carbonyls (acetates), thiols, sulphoxides, sulphonates, amines, azos or nitriles, and wherein two R groups may connect to form a monocyclic or heterocyclic ring; and (ii) an anion selected from the group consisting of (R'O)$_x$PF$_{6-x}$ (phosphate), (R'O)$_x$BF$_{4-x}$ (borate), R'SO$_2$NSO$_2$R' (imide), R'SO$_2$C(SO$_2$R')(SO$_2$R') (methide), FSO$_2$NSO$_2$F, $C_2O_4BF_2$, $C_2O_4PF_2$, $RC_2O_4BF_2$, $RC_2O_4PF_4$, $CF_3SO_3$ (triflate), R'SO$_3$ (sulphonate), R'CO$_2$, (carboxylate), $CF_3COO$ (trifluoroacetate), R'$_x$PF$_{6-x}$ (FAP), R'$_x$BF$_{4-x}$ wherein each R' group is independently linear, branched or cyclic and preferably comprises from 1 to 18 carbon atoms, optionally partially or completely fluorinated and optionally including a functional group, preferably chosen from ethers, alcohols, carbonyls (acetates), thiols, sulphoxides, sulphonates, amines, azos or nitriles and wherein two R' groups may connect to form a monocyclic or heterocyclic ring.

In some embodiments the ionic liquid comprises a cation selected from the group consisting of C4mpyr (butyl-methyl pyrrolidimium), $P_{6,6,6,14}$ (trihexyl tetradecyl phosphonium), $P(C_2R_f)_4$ (where $R_f$ is a perfluoralkyl), and an anion selected from the group consisting of eFAP ($C_2F_5PF_3$), NfO (nonafluorobutane sulphonate), PFO (perfluorooctane sulphonate), FSI (bis(fluorosulphonyl)imide), NTf$_2$ (bis(trifluoromethylsulphonyl)imide), B(otfe)$_4$ (tetrakis(2,2,2-trifluoroethane)borate and $CF_3COO$ (trifluoroacetate).

In some embodiments, the ionic liquid includes a cation selected from $PR_{1-4}$(phosphonium) cations and an anion selected from $RSO_3$ (sulphonate; such perfluorobutanesulphonate, perfluoropropanesulphonate), or trifluorophosphates (such as eFAP; tris(perfluoroethyl)trifluorophosphate).

In some embodiments, a hydrogen-containing species is oxidised at an anode in electrochemical communication with the electrolyte. The hydrogen containing species may suitably be $H_2O$ or $OH^-$ (for acidic and alkaline aqueous electrolytes respectively) or $H_2$, which may optionally be recycled from the hydrogen co-produced with ammonia at the cathode via the HER. In some embodiments, the source of hydrogen, such as $H^+$, may be provided, or replenished, in the electrolyte by oxidising the hydrogen-containing species. The anode may be directly in contact with the electrolyte, or may be in contact with a physically separated second electrolyte which is in electrochemical communication with the cathodic electrolyte via a salt bridge.

The electrocatalytic composition and electrolyte may be maintained at a temperature in the range of $-35°$ C. to $200°$ C., or $0°$ C. to $150°$ C., such as $15°$ C. to $100°$ C. during reduction. The dinitrogen contacted with the electrocatalytic composition may be supplied at a partial pressure in the range of 0.7 bar to 100 bar, or 1 bar to 30 bar, or 1 bar to 12 bar. Elevated partial pressures of $N_2$ may improve the faradaic efficiency of the NRR by increasing the concentration of $N_2$ dissolved in the electrolyte, thereby favouring binding and subsequent reduction of $N_2$ at catalytic sites on the electrocatalytic composition.

In embodiments where ammonia is produced as a gas (for example when using an aprotic electrolyte), the withdrawn product stream may comprise a mixture of unreacted $N_2$, $NH_3$ and $H_2$. The gaseous products may then be separated by conventional means and unreacted $N_2$ (and $H_2$) returned to the cathode feed. The $H_2$ can optionally recycled for reaction at the anode. In embodiments where ammonia is produced as ammonium cations (for example when using an acidic aqueous electrolyte), the product stream withdrawn is a liquid comprising electrolyte with dissolved ammonium product and unreacted dinitrogen. A continuous feed of fresh electrolyte may thus be fed to the cell to replace the electrolyte withdrawn via the product stream.

The method may conducted as a batch, semi-continuous or continuous process. In a continuous process, for example, dinitrogen is fed continuously for reaction at the electrocatalytic composition, and a product stream comprising ammonia is continuously withdrawn.

EXAMPLES

The present invention is described with reference to the following examples. It is to be understood that the examples are illustrative of and not limiting to the invention described herein.

Materials and Methods

All chemical precursors were obtained from commercial suppliers of laboratory grade reagents, including Sigma Aldrich.

XRD measurements were performed using a Bruker D8 Advance diffractometer instrument equipped with standard Cu anode, K-α wavelength=1.54 nm. The typical scan range was 10° to 80°, collected with step size of 0.039° s$^{-1}$.

Raman measurements were performed using a Renishaw Raman microscope equipped with at 514 nm excitation laser.

Specimens for electron microscopy were prepared by deposition of $MoS_2$ suspensions on a holey carbon support film on a copper grid (8 droplets of 50 μg/mL suspension in dimethylformamide). The specimens were stored in glass desiccator to avoid contamination. Scanning transmission electron microscopy (STEM) examination was carried out using an aberration-corrected JEOL ARM200F microscope operating at 80 kV to minimize radiation damage to the specimens. The instrument was fitted with a cold field emission electron source and a JEOL large area (1$^{st}$) energy dispersive X-ray spectrometer (EDS). This was coupled to a Noran System Seven analytical system. All imaging and analysis was carried in scanning transmission mode (STEM) using a high resolution-imaging probe of approximately 30 pA current and 0.1 nm diameter with a convergence semi-angle of 24.9 mrad. Imaging was carried out in high angle annular dark field (HAADF) and bright field (BF) modes, yielding mass-thickness and diffraction contrast information respectively. The inner and outer acceptance angles for HAADF imaging were 68 and 280 mrad, respectively, and for BF imaging the acceptance semi-angle was 17 mrad. Scanning images were captured using Gatan's DigiScan hardware and Digital Micrograph software.

X-ray photoelectron spectroscopy measurements were performed with Thermo ESCALAB250i X-ray photoelectron spectrometer. For spectra calibration, the C1s were aligned to 284.80 eV.

Electrochemical evaluations were conducted in an H-type electrochemical cell, as schematically depicted in FIG. 3. A glass frit separated the cathodic chamber from the anodic chamber. A Teflon pipe was provided in the cathodic chamber to bubble a gas ($N_2$ or Ar) into the electrolyte, with the gas outlet positioned close to the cathode. An effluent gas port was provided to remove gas from the headspace of the cathodic chamber. A three electrode set-up with a VMP2-Biologic potentiostat was used in all measurements. The working cathode (cathode) and reference electrodes (saturated Ag/AgCl) were positioned in the cathodic chamber, and the anode (Pt wire) in the anodic chamber.

The chosen electrolyte for each experiment (either 10 mM HCL, 10 mM KOH or 1 M $Na_2SO_4$) was then added to the cell, and purged with gas (high-purity $N_2$ or Ar, Alphagaz-grade; purity 99.9999%) before the electrochemical measurements for 30 min at a constant flow rate of 60 ml min$^{-1}$. Electrochemical measurements or electrolysis were then conducted with continuous gas purging.

The ammonia yield was determined by the indophenol blue method. From the cathodic chamber electrolyte solution, electrolyte (0.5 mL) was taken and transferred into a 1 mL sample tube. Into the tube was then added 0.5 M $NaClO_4$ (0.5 mL), 1M NaOH with 5 wt. % salicylic acid and 5 wt. % sodium citrate solution (50 μL) and 0.5 wt. % $C_5FeN_6Na_2O$ (sodium nitroferricyanide) in water (10 μL). The mixture was then incubated in the dark at room temperature for 3 hours before the UV-Vis test.

The concentration of ammonia was then determined by measuring the indophenol blue absorbance at 660 nm, and correlating the absorbance with ammonia concentration using a calibration plot. To generate the calibration plot, a series of standard solutions with known amount of $NH_4Cl$ in 10 mM HCl were prepared, and the above-mentioned indophenol blue reagents were added. The indophenol blue absorbance at 660 nm was then determined after 3 hours. The limit of detection (LOD) in this study refers to the absorbance at 660 nm obtained from blank 10 mM HCl.

Faradaic efficiency (FE) was then back-calculated from the amount of ammonia detected by the UV-Vis measurement ($n_{UV\text{-}Vis}$). The efficiency was determined by calculating the theoretical amount of produced $NH_3$ based on the six-electron transfer process of dinitrogen reduction to ammonia using $H_2O$ as proton source ($N_2$+6 $H_2O$+6 e$^-$≈2 $NH_3$+6 $OH^-$), using the Faraday's law:

$$n_t = q/F\,z$$

where:

n is the theoretical moles amount of produced ammonia.
q is the total electric charge passed for the duration of electrolysis (C).
F is the Faraday's constant (96485.3 C mol$^{-1}$).
z is the number of electron transfer involved in reduction of N atom (3 e$^-$ per mole of $NH_3$).

Thus, FE (%) is determined as follows:

$$FE(\%) = n_{UV\text{-}vis}/n_t \times 100\%$$

The ammonium yield rate (in mol·cm$^{-2}$·s$^{-1}$) is determined as the average rate of formation of the measured ammonia product ($n_{UV\text{-}Vis}$) during the experiment, normalised to the electrode surface area.

Example 1

$MoS_2$ powder (1 g) was lithiated in 10 ml n-butyllithium for 72 hours under argon gas to produce Li—$MoS_2$ (sample 1-1, see Table 2). This process is known to produce Li—$MoS_2$ with the $MoS_2$ layers in the 1T polymorphic phase (Wang et al, Nanoscale 2015, 7, 19764-19788). When Li—$MoS_2$ is exposed to hydrolytic conditions, the lithium metal is known to exfoliate the $MoS_2$ host. The exfoliated 1T polymorphic form thus formed is believed to be stable against reversion to 2H for the duration of short electrochemical experiments. Thus, when a suspension of sample 1-1 was dropcast onto a cathode and electrochemically evaluated in aqueous electrolytes (see examples 5 and 6), the resulting $MoS_2$ material (designated sample 1-4 in Table 2) was believed to be exfoliated $MoS_2$ at least partially in the 1T polymorphic form.

$RuCl_3$ (60 mg) and Li—$MoS_2$ (100 mg) were dispersed in 10 ml of anhydrous N-methylpyrollidone (NMP), and the mixture was transferred to a teflon-lined 20 mL autoclave. The autoclave was then thermally incubated at 80° C. for 72 hours. Following the reaction, the mixture was filtered and the solids were washed with 100 mL aliquots of isopropanol, ethanol, methanol and water in succession and then dried at room temperature under vacuum overnight. The resulting Ru—$MoS_2$ material is designated sample 1-2; see Table 2.

The Ru—$MoS_2$ material (sample 1-2) was then hydrothermally treated in 15 mL of Milli-Q water at 150° C. for 12 hours. The solids were filtered, washed with copious amount of Milli-Q water and then dried at room temperature under vacuum overnight. The resultant thermally treated Ru—$MoS_2$ material is designated sample 1-3; see Table 2.

Figure 4:
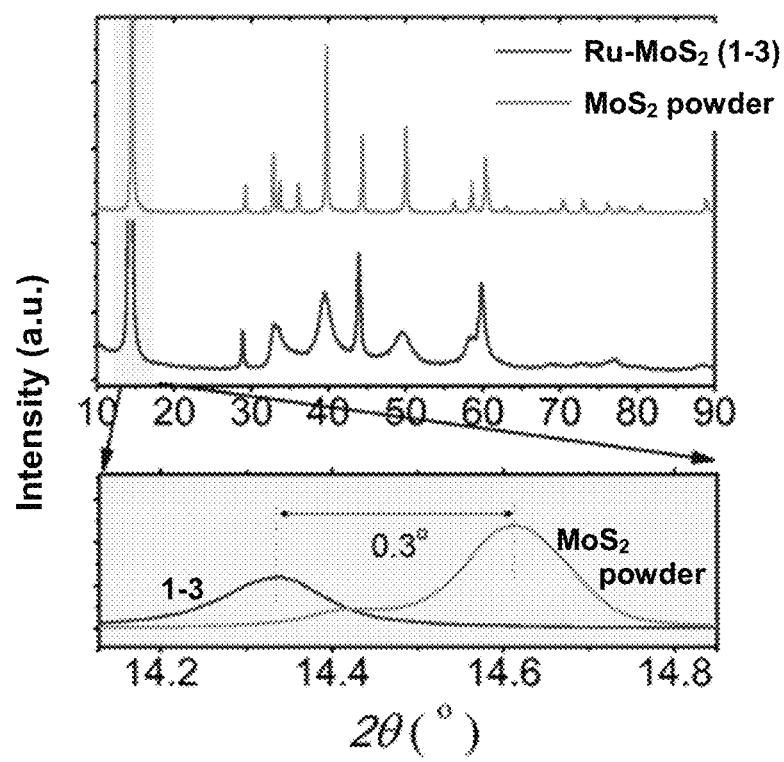
FIG. 4 depicts X-ray diffraction spectra (XRD) of Ru-intercalated $MoS_2$ sample 1-3 prepared in example 1, and the $MoS_2$ starting material.

The Ru—$MoS_2$ samples were characterised by a number of techniques. FIG. 4 shows X-ray diffraction spectra (XRD) of the Ru-intercalated $MoS_2$ (sample 1-3). In contrast to the spectrum of the initial $MoS_2$ powders, sample 1-3 exhibits spectral shift and reduced intensity. The 0.3° shift of the {002} peak from 14.6° to 14.3° indicates interlayer expansion due to the Ru intercalation. Additionally, the intensity of the {002} is significantly reduced following intercalation which corresponds to increased degree of $MoS_2$ exfoliation.

Figure 5:
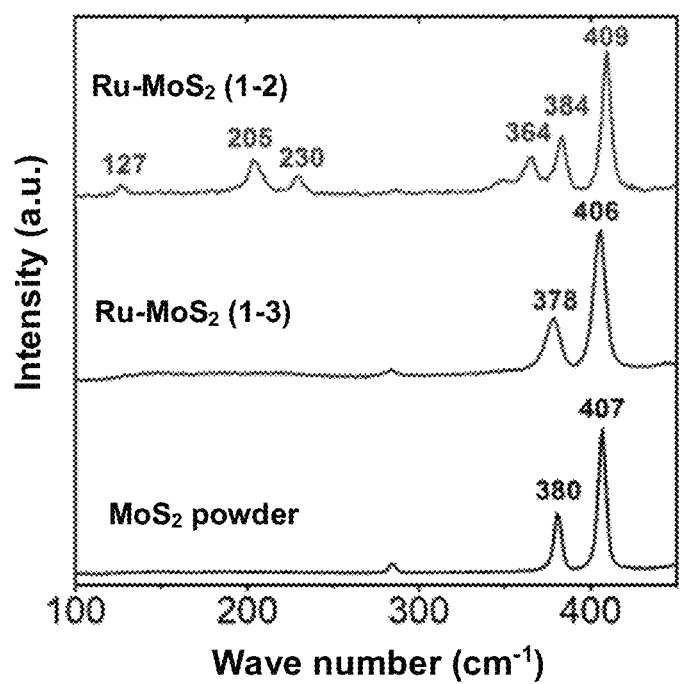
FIG. 5 depicts Raman spectra of Ru-intercalated $MoS_2$ samples 1-2 and 1-3 prepared in example 1, and the $MoS_2$ starting material.

Phase characterization of the Ru—$MoS_2$ materials (samples 1-2 and 1-3) and the $MoS_2$ powder starting material was also performed with Raman spectroscopy, with the spectra shown in FIG. 5. The characteristic 2H-$MoS_2$ bands at ~380 and ~407 $cm^{-1}$, attributable to $E^1_{2g}$ and $A_{1g}$ modes respectively, are observed in all samples. These modes are responsible for the in-plane (intralayer) and out-of-plane (interlayer) vibrations (Jana et al, Philosophical Transactions of the Royal Society A: Mathematical, Physical and Engineering Sciences 2016, 374). The band broadening observed in the Ru-functionalized $MoS_2$ samples (both 1-2 and 1-3) is attributed to the strain induced by Ru-functionalization along the basal plane of $MoS_2$, and the reduction in the average number of directly stacked $MoS_2$ layers due to intercalation of the Ru metal. The observed shifts in peak positions from the $MoS_2$ starting material can be correlated to the variation of inter-particle coulomb (charge) interactions between different samples.

The 2H phase is the only polymorphic form present in both the $MoS_2$ starting material and the hydrothermally treated Ru—$MoS_2$ material (sample 1-3). By contrast, the intermediate sample 1-2 Ru—$MoS_2$ material comprises a mixture of both 1T and 2H polymorphic forms. The characteristic bands at ~205 ($J_1$), 230 ($J_2$) and 364 $cm^{-1}$ ($J_3$) originate from the distorted octahedral coordinated Mo superlattice in 1T-$MoS_2$ (Wu et al, Advanced Materials Interfaces 2016, 3, 1500669). It is estimated that the 1T phase constitutes at least 30 mass % of the total $MoS_2$.

The morphology and composition of samples 1-2 and 1-3 was further analysed with aberration-corrected high angle annular dark field (HAADF) scanning transmission electron microscopy (STEM) with single atom resolution, as shown in FIG. 6. STEM images of samples 1-3 are shown in FIGS. 6a (low resolution) and 6c (high resolution), and a high resolution STEM image of sample 1-2 is shown in FIG. 6b. The low and high resolution images confirm that the Ru is present as amorphous clusters dispersed on the $MoS_2$ support, with a cluster size of about 2 nm. The amorphous nature of the Ru clusters observed is consistent with the absence of peaks attributable to crystalline Ru in the XRD spectra (FIG. 4).

The hydrothermal conversion of the $MoS_2$ support from a mixture of 1T and 2H phases (sample 1-2) to exclusively 2H-$MoS_2$ (sample 1-3) was also confirmed by the distinctly different lattice fringes of the host $MoS_2$ structure. As seen in FIGS. 6b and 6c, samples 1-2 and 1-3 exhibit a trigonal lattice motif and a hexagonal lattice motif, respectively. These features are consistent with previous reports (e.g. Lin et al, Nat Nanotechnol 2014, 9, 391), and correspond to the crystallographic configuration of the 1T and 2H phases schematically depicted in FIG. 6d.

The presence of Ru clusters over the surface of the $MoS_2$ support was also confirmed with energy dispersive X-ray (EDS) characterization. Peaks at 2.29 keV and 2.56 keV in the acquired EDS spectrum were assigned to Mo and Ru, respectively, in regions where Ru clusters were present. Survey EDS images demonstrated the uniform distribution of Ru atomic clusters dispersed across the stacked $MoS_2$ sheets.

Figure 7:
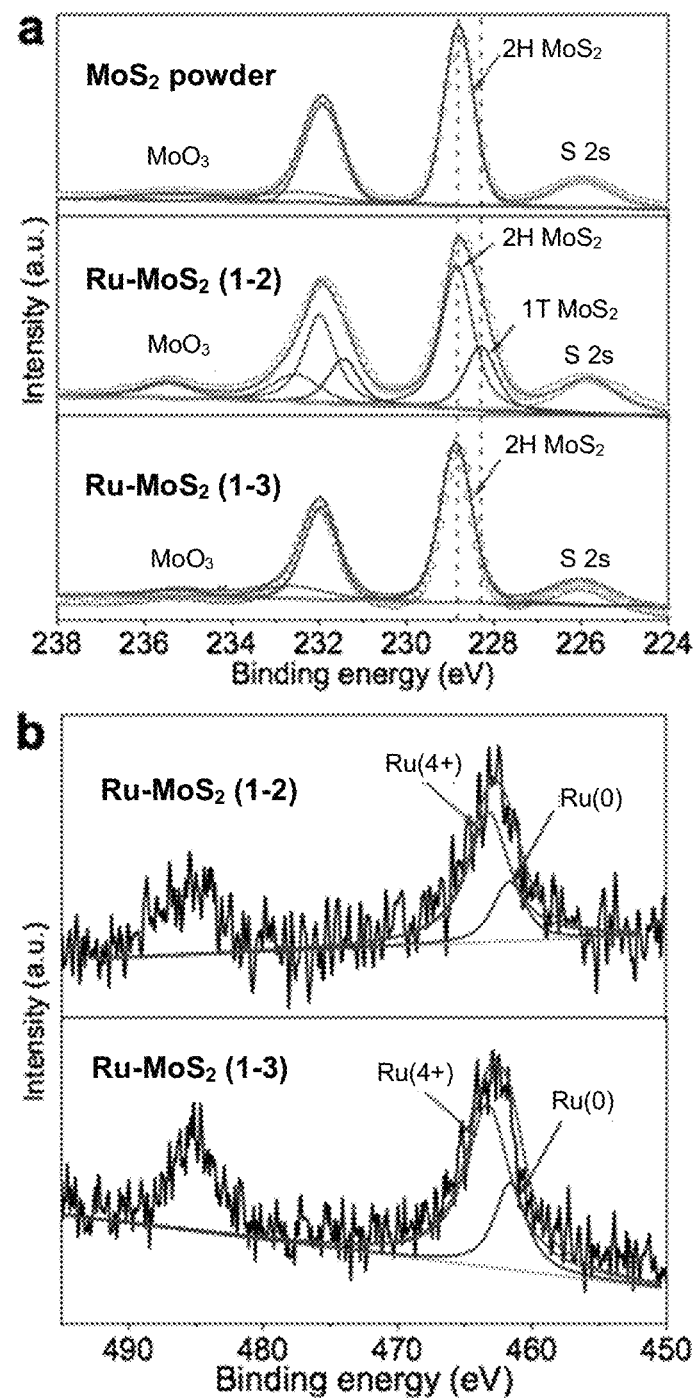
FIG. 7 depicts X-ray photoelectron spectroscopy (XPS) spectra of Ru-intercalated $MoS_2$ samples 1-2 and 1-3 prepared in example 1, and the $MoS_2$ starting material.

The phases of the Ru—$MoS_2$ samples were further characterized by X-ray photoelectron spectroscopy (XPS), with the spectra shown in FIG. 7. The high-resolution Mo 3d XPS scan for sample 1-2 (in FIG. 7a) exhibits peaks at 228.3 eV and 231.4 eV, corresponding to the Mo $3d_{5/2}$ and Mo $3d_{3/2}$ peak for 1T-$MoS_2$, respectively. It was estimated from the data that 30 mass % of the $MoS_2$ phase is present as 1T polymorph. This is regarded only as a minimum bound of the actual amount of 1T phase in sample 1-2, since it is possible that some transition from 1T to 2H phase would have been triggered by the analysis. By contrast, only Mo 3d peaks at 228.8 eV and 231.9 eV, associated with 2H-$MoS_2$ phase, were detected in sample 1-3 (also FIG. 7a), confirming the hydrothermally driven phase conversion from 1T-$MoS_2$ to 2H-$MoS_2$. The S:Mo atomic ratios calculated for both samples 1-2 and 1-3 are approximately 1.65. These values are lower than that of the original $MoS_2$ powder (expected Mo:S ratio of 2). It is believed that this indicates the presence of large amounts of S-vacancy defects in the Ru—$MoS_2$ samples.

The Ru 3p spectra (FIG. 7b) indicate that the Ru clusters in both analysed samples 1-2 and 1-3 are a mixture of $Ru^0$ and $Ru^{4+}$ oxidation states. The latter is likely formed due to the surface oxidation of the Ru clusters upon exposure to air during sample preparation. The XPS results are consistent with the presence of chemically similar Ru clusters in both samples, despite the phase transformation of the $MoS_2$ support.

The results discussed herein indicate that, during synthesis of sample 1-2 at 80° C., $Ru^{3+}$ metal ions diffuse into the interlayers of Li—$MoS_2$, and are reduced in-situ by the interspersed Li to form intercalated ruthenium metallic clusters. Only partial reversion of the 1T $MoS_2$ phase to the 2H phase occurs during this synthesis. Complete reversion to the 2H phase only occurs after a hydrothermal treatment at temperatures of 150° C., which however leaves the ruthenium clusters substantially unchanged. The properties of the samples are summarised in Table 2.

TABLE 2

| Sample | Composition | $MoS_2$ phase | Ru content (mass %) | Ru morphology | Mo:S (surface) |
|---|---|---|---|---|---|
| Starting material | 2H-$MoS_2$ | 2H (100%) | 0 | — | 2 |
| 1-1 | Li-$MoS_2$ | 1T | 0 | — | n.d. |
| 1-2 | Ru-$MoS_2$ | 1T (~30%); 2H (~70%) | ~4.5 | metallic clusters, (~2 nm | 1.65 |
| 1-3 | Ru-$MoS_2$ | 2H (~100%) | ~4.5 | metallic clusters, (~2 nm | 1.65 |
| 1-4 | $MoS_2$ (exfoliated) | (1T) | 0 | — | n.d. |

Example 2

A mixture of sodium oleate, $RuCl_3$ (1 mM) and $FeCl_3$ (1 mM) in water was prepared. The Ru—Fe-oleate mixture was transferred to hexane, and then drop-cast onto carbon fibre paper (CFP). After removing the solvent by evaporation overnight, the Ru—Fe-oleate/CFP was placed in a tube furnace and calcined at 500° C. in Ar for 3 h. During the calcination, the Fe oxidised to form $Fe_2O_3$ initially, and the Ru was later reduced in situ when the oleate decomposed at high temperatures. The resultant Ru—$Fe_2O_3$ material, designated sample 2-1, was obtained and used as electrode for a nitrogen reduction reaction experiment, without adding a binder.

Control electrodes comprising only one of Ru nanoparticles or $Fe_2O_3$ were prepared by a similar methodology, with the intention of demonstrating the importance of the synergistic effect between catalytically active sites and semiconducting substrate. Thus an electrode of Ru nanoparticles on CFP, designated sample 2-2, was prepared using only $RuCl_3$ (2 mM) in the starting solution, and an electrode of $Fe_2O_3$ on CFP, designated sample 2-3, was obtained using only $FeCl_3$ (2 mM) in the starting solution. The samples were characterised by X-ray diffraction (XRD). The results confirmed the presence of $Fe_2O_3$ in samples 2-1 and 2-3.

Example 3

$RuCl_3$ (10 mg) was dissolved in 20 mL DI water in the presence of $TiO_2$ nanoparticles (100 mg). After sonicating and stirring for 30 min, 35% hydrazine solution (10 mL) was added dropwise. The mixture was stirred for another 2h before filtering the solids, washing with copious water and then drying at 60° C. under vacuum overnight to produce an Ru—$TiO_2$ catalyst designated sample 3-1. It is expected that the Ru is present as metallic clusters in sample 3-1, and that the $TiO_2$ is present exclusively in the rutile polymorphic phase.

Example 4

$FeCl_3$ (60 mg) and Li—$MoS_2$ (100 mg) were dispersed in 10 ml of anhydrous N-methylpyrollidone (NMP), and the mixture was transferred to a teflon-lined 20 mL autoclave. The autoclave was then thermally incubated at 80° C. for 72 hours. Following the reaction, the mixture was filtered and the solids were washed with 100 mL aliquots of isopropanol, ethanol, methanol and water in succession and then dried at room temperature under vacuum overnight. The resulting Fe—$MoS_2$ material was then hydrothermally treated in 15 mL of Milli-Q water at 150° C. for 12 hours. The solids were filtered, washed with copious amount of Milli-Q water and then dried at room temperature under vacuum overnight. The resultant thermally treated Fe—$MoS_2$ material is designated sample 4-1. It is expected that the Fe is present as intercalated metallic clusters in sample 4-1, and that the $MoS_2$ is present exclusively in the 2H polymorphic phase.

Example 5

Electrodes were prepared by drop-casting the electrocatalytic composition onto carbon fiber paper (CFP) substrates. The electrocatalyst for evaluation (5 mg) was dispersed in a 1:50 5% Nafion:methanol solution (1 ml) by ultra-sonication for 30 min. The catalyst dispersion (200 µL) was then drop-cast onto a 1 cm×1 cm CFP substrate and dried under ambient conditions. The resulting catalyst loading on the electrode is thus 1 mg/$cm^2$.

Example 6

Figure 8:
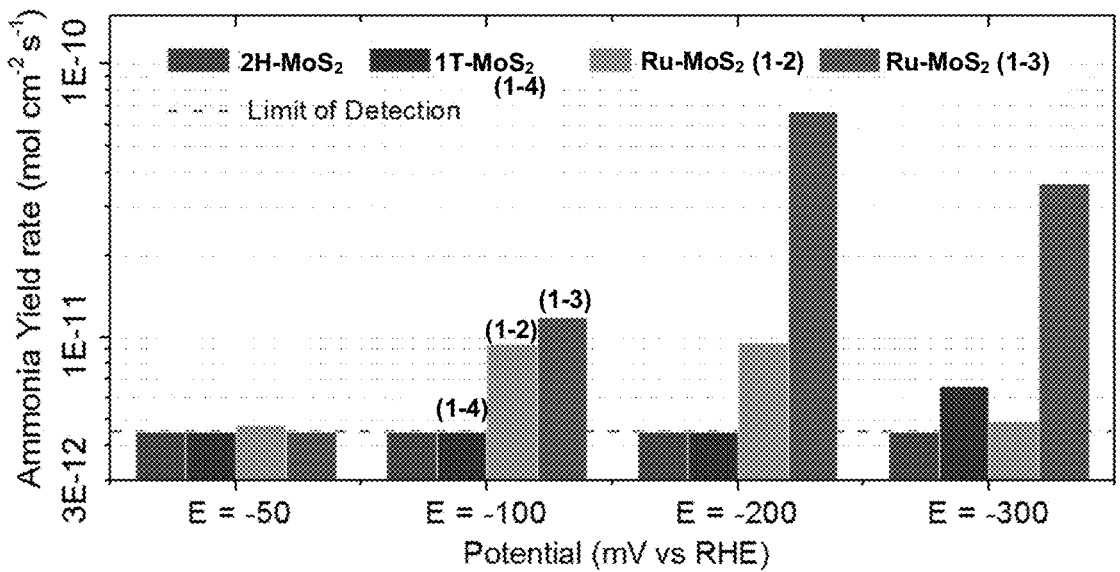
FIG. 8 is a plot of ammonia yield rate of exfoliated 1T-$MoS_2$, Ru-intercalated $MoS_2$ samples 1-2 and 1-3 and the 2H-$MoS_2$ starting material, at a range of applied potentials, in nitrogen reduction reactions performed in example 6.

Ru—$MoS_2$ samples 1-2 and 1-3 (intercalated Ru clusters on mixed 1T- and 2-H polymorphic $MoS_2$ and exclusively 2H-polymorphic $MoS_2$, respectively) were evaluated for their nitrogen reduction reaction (NRR) performance at a range of continuous potentials (−50, −100, −200 and −300 mV vs RHE) in the electrochemical cell, using a 10 mM HCl electrolyte and continuous $N_2$ gas purging. For comparison, the 2H-$MoS_2$ starting material and the exfoliated 1T-$MoS_2$ (sample 1-4) were also evaluated. The results are depicted in FIG. 8.

The Ru—$MoS_2$ samples (samples 1-2 and 1-3) provided significant NRR activity at potentials of at −100 mV or greater. By contrast, the NRR performance of both $MoS_2$ starting material and Li—$MoS_2$ (sample 1-1) across the tested potentials is very low, with the results generally indistinguishable from the background (i.e. at the limit of detection). Thus, NRR performance is provided by the functionalization with Ru amorphous nanoparticles. Notably, the NRR activity for both samples 1-2 and 1-3 is significantly higher than for unsupported ruthenium nanoparticles. Some of the inventors have obtained NRR activity of only ~9.0×$10^{-12}$ mol $cm^{-2}$ $s^{-1}$ for ruthenium nanoparticles at a Ru loading on the electrode of 1.7 mg $cm^{-2}$, a significantly higher loading than presently tested for samples 1-2 and 1-3 (~45 µg $cm^{-2}$). This indicates a synergistic interaction between the ruthenium clusters and the $MoS_2$ support, which the inventors believe can be attributed to the role of NRR active sites lying at the interface between Ru and $MoS_2$.

Although both Ru—$MoS_2$ samples produce NRR activity, sample 1-3 which has $MoS_2$ exclusively in the 2H polymorphic form exhibits far higher ammonium yield rate than sample 1-2 which has $MoS_2$ present in a mixture of 1T and 2H polymorphic forms. Thus, the ammonium yield of Ru—$MoS_2$ sample 1-3 was 5.8×$10^{-1}$ mol $cm^{-2}$ $s^{-1}$ (following Ar background subtraction) at E=−200 mV, almost an order of magnitude higher than that of Ru—$MoS_2$ sample 1-2 (9.6× $10^{-12}$ mol $cm^{-2}$ $s^{-1}$).

Figure 9:
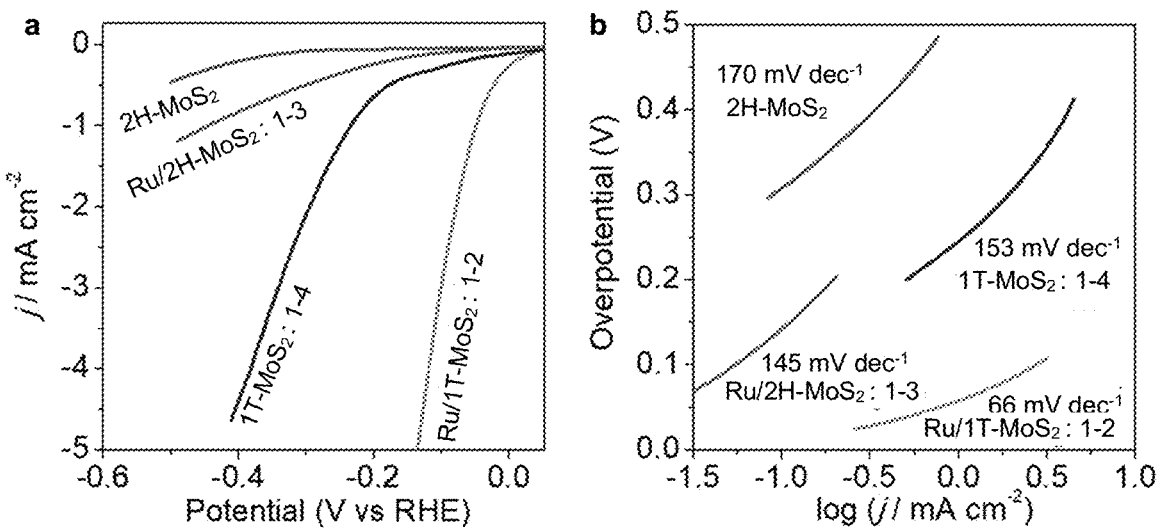
FIG. 9 depicts the polarisation curves and Tafel plots obtained for exfoliated 1T-$MoS_2$, Ru-intercalated $MoS_2$ samples 1-2 and 1-3 and the 2H-$MoS_2$ starting material in linear sweep voltammetry experiments performed in example 6.

In order to investigate catalytic activities for the competing hydrogen evolution reaction (HER), electrodes with the same electrocatalyst samples ($MoS_2$ powder, samples 1-1, 1-2 and 1-3) were subjected to linear sweep voltammetry (LSV), collected at a scan rate of 5 mV $s^{-1}$ in 10 mM HCl while purging with Ar. The results are depicted in FIG. 9, including the polarisation curves (FIG. 9a) and the tafel plots (FIG. 9b).

Ru—$MoS_2$ sample 1-2, with $MoS_2$ present in a mixture of 1T and 2H polymorphic forms, is by far the most active HER catalyst, has an HER onset overpotential of 49 mV and a Tafel slope of 100 mV $dec^{-1}$. In contrast, Ru—$MoS_2$ sample 1-3, with $MoS_2$ exclusively in the 2H polymorphic form, has an onset overpotential of 187 mV and a Tafel slope of 260 mV $dec^{-1}$.

Similar trends in HER activities were observed for the Ru-free materials. Exfoliated $MoS_2$ sample 1-4, with $MoS_2$ present in the 1T phase, has an onset overpotential of 233 mV and a Tafel slope of 187 mV $dec^{-1}$, whereas $MoS_2$ starting material with $MoS_2$ in the 2H phase has an onset overpotential of 330 mV and a Tafel slope of 273 mV $dec^{-1}$.

Thus, the presence of Ru clusters has a moderate effect on reducing the energy barrier for HER for a given $MoS_2$ support (c.f. sample 1-2 vs sample 1-4 with $MoS_2$ supports including the 1T polymorphic form; and sample 1-3 vs $MoS_2$ powder having exclusively the 2H polymorphic form). However, the polymorphic form of the support has a far larger effect: the presence of 30% or more 1T phase in the $MoS_2$ support dramatically increases the HER activity.

It will be appreciated that the HER is an undesirable side reaction when attempting to reduce nitrogen to ammonia in aqueous electrolytes. Thus, the relatively low HER activity of Ru—MoS$_2$ sample 1-3 compared to that of Ru—MoS$_2$ sample 1-2, in combination with the higher ammonia yield rates for sample 1-2 compared with sample 1-3, indicates that sample 1-3 is a far superior NRR electrocatalyst than sample 1-2. The inventors believe that the facile charge transfer of the metallic 1T phase, even when present at only 30% in the support, undesirably promotes the HER relative to the desired NRR. By contrast, ensuring that a high percentage of the MoS$_2$ support, preferably close to 100%, is in the semiconductive 2H phase, suppresses the competitive HER while surprisingly also increasing the rate of the NRR.

Example 7

Figure 10:
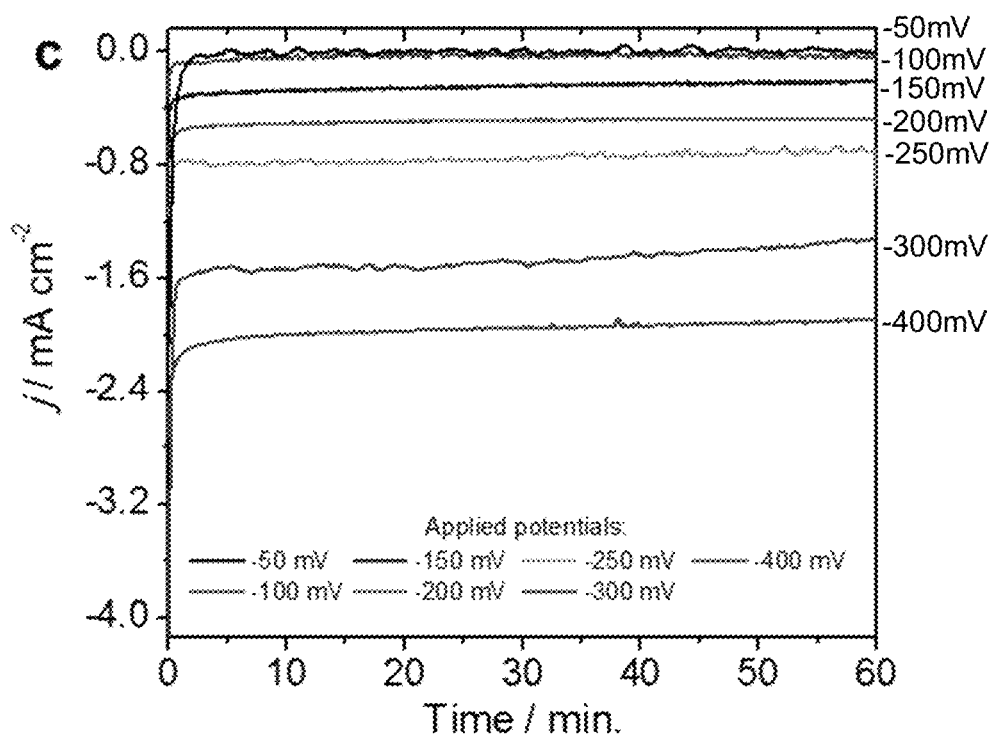
FIG. 10 depicts j-t curves of Ru-intercalated $MoS_2$ sample 1-3, at a range of applied potentials, in nitrogen reduction reactions performed in example 7.
Figure 11:
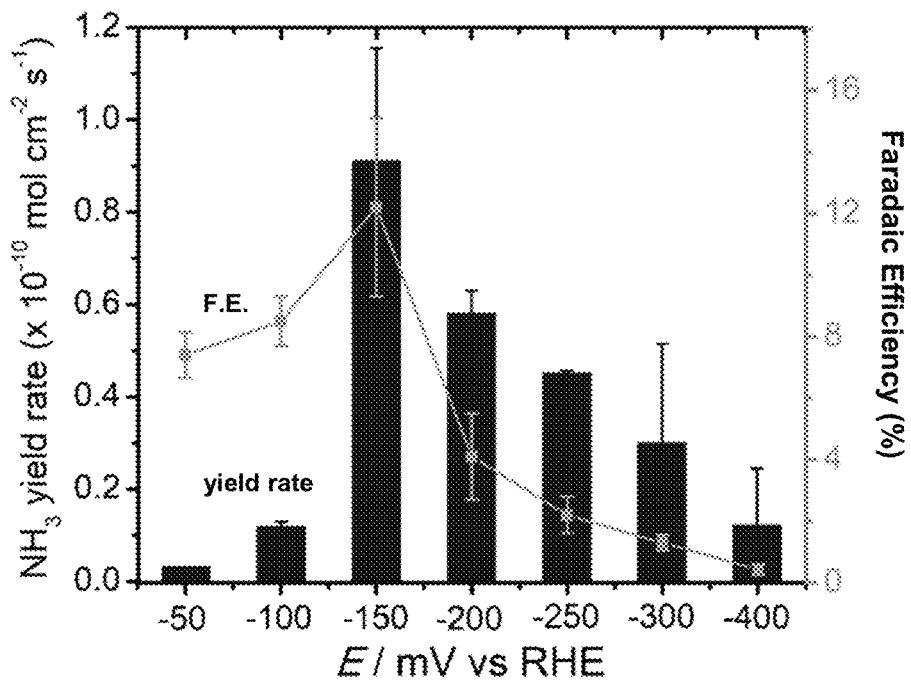
FIG. 11 is a plot of ammonia yield rate and faradaic efficiency obtained with Ru-intercalated $MoS_2$ sample 1-3, at a range of applied potentials, in nitrogen reduction reactions performed in example 7.

The cathodic potential of Ru—MoS$_2$ sample 1-3 for NRR, in the range of −50 to −400 mV vs RHE was then further optimized in a series of continuous potential experiments in 10 mM HCl with continuous N$_2$ purging. The results are shown in the j-t curve depicted in FIG. 10, and the graphs of ammonia yield rate and faradaic efficiency depicted in FIG. 11.

Ru—MoS$_2$ sample 1-3 thus produced an NRR selectivity (Faradaic efficiency, FE) of 8.5% and a NH$_3$ yield rate of $1.2 \pm 0.1 \times 10^{-11}$ mol cm$^{-2}$ s$^{-1}$ at −100 mV vs RHE. This NRR catalytic performance is among the best reported to date at potentials close to the RHE (i.e. ≤100 mV).

At a more negative potential of −150 mV, a high NH$_3$ yield rate of $9.1 \pm 0.2 \times 10^{-11}$ mol cm$^{-2}$ s$^{-1}$ is obtained, and the Faradaic efficiency (FE) increased considerably to a maximum measured value of 13.6%, corresponding to an average electrolytic current density of ~0.2 mA cm$^{-2}$ (mean FE=12.2±3.0%, calculated from 4 experiments). The inventors believe that Ru—MoS$_2$ sample 1-3 is thus the most selective NRR catalyst capable of delivering a practically useful NH$_3$ production rate capability in the range of $10^{-11}$ mol cm$^{-2}$ s$^{-1}$ at ambient conditions. The material also retained substantial NRR catalytic activity over a four hour experiment, demonstrating an acceptable catalytic stability.

Further increases in potential resulted in a loss of both ammonia yield rate and faradaic efficiency, due to the increasing competitiveness of the HER. The optimum potential (i.e. about 150 mV vs RHE) corresponds well to the position of reductive peak found in the corresponding LSV of sample 1-3 shown in FIG. 9.

The effect of reaction temperature on NRR with sample 1-3 at the optimised potential −150 mV was also investigated. A maximum FE and NH$_3$ yield rate of ~17.6% and ~$1.14 \times 10^{-10}$ mol cm$^{-2}$ s$^{-1}$ was achieved at an electrolysis temperature of 50° C., consistent with the Arrhenius equation. However, at 60° C. a significant decrease of the FE and NH$_3$ yield rate (to ~3.6% and $4.55 \times 10^{-11}$ mol cm$^{-2}$ s$^{-1}$) was observed, which may be related to decreased N$_2$ solubility in the electrolyte at higher temperatures.

Ru—MoS$_2$ sample 1-2 (with mixed 1T and 2H MoS$_2$ polymorphs) was also subjected to continuous potential NRR at −150 mV vs RHE in 10 mM HCl with continuous N$_2$ purging. The comparative results, presented in Table 3, again demonstrate the superior activity and selectivity of the sample 1-3 catalyst with only 2H polymorphic phase.

TABLE 3

| Sample | NH$_3$ yield rate (mol cm$^{-2}$ s$^{-1}$) | Faradaic efficiency (%) |
|---|---|---|
| 1-2 (Ru-MoS$_2$; 1T and 2H MoS$_2$ polymorphs) | 2.3 E−11 | 1.8 |
| 1-3 (Ru-MoS$_2$; 2H MoS$_2$ polymorph) | 9.1 E−11 | 12.2 |

Example 8

The NRR performance of Ru—Fe$_2$O$_3$ sample 2-1 was investigated in a continuous potential experiment, with 1 M Na$_2$SO$_4$ electrolyte and continuous N$_2$ purging. The Ru nanoparticle sample 2-2 and Fe$_2$O$_3$ sample 2-3 were also evaluated. The results are displayed in Table 5.

TABLE 5

| Sample | Potential (mV vs RHE) | NH$_3$ yield rate (mol cm$^{-2}$ s$^{-1}$) | Faradaic efficiency (%) |
|---|---|---|---|
| 2-1 (Ru-Fe$_2$O$_3$ on CFP) | −100 | 1.3 E−11 | 8.7 |
| 2-2 (Ru on CFP) | −100 | 2.8 E−12 | 1.2 |
| 2-3 (Fe$_2$O$_3$ on CFP) | −100 | 2.2 E−12 | 1.9 |

Excellent faradaic efficiency of 8.7%, at an acceptable ammonia yield rate, demonstrates that the effectiveness of Fe$_2$O$_3$ as a suitable semiconductive support material. Fe$_2$O$_3$, which has a conduction band minimum energy of +0.73 V, i.e. significantly below −0.3 V vs NHE, is thermodynamically unstable at the applied potentials in the experiment. However, reduction of Fe$_2$O$_3$ to Fe(II) is sufficiently slow that the material is expected to remain predominantly as Fe$_2$O$_3$ during the NRR experiment. In comparison, the Ru-only sample 2-2 and Fe$_2$O$_3$-only sample 2-3 demonstrate a very low yield rate of ~$2.78 \times 10^{-12}$ mol cm$^{-2}$ s$^{-1}$ and ~$2.22 \times 10^{-12}$ mol cm$^{-2}$ s$^{-1}$, respectively, and low Faradaic efficiency. The results confirm the synergistic enhancement of NRR performance of the metal nanoparticles by the semiconducting substrate.

Example 9

The NRR performance of Ru—TiO$_2$ sample 3-1 was investigated in a continuous potential experiment, with 10 mM HCl electrolyte and continuous N$_2$ purging. The result is displayed in Table 6.

TABLE 6

| Sample | Potential (mV vs RHE) | NH$_3$ yield rate (mol cm$^{-2}$ s$^{-1}$) | Faradaic efficiency (%) |
|---|---|---|---|
| 3-1 (Ru-TiO$_2$; rutile polymorph) | −150 | 0.7 E−11 | 9.5 |

Excellent faradaic efficiency of 9.5%, albeit at a rather low ammonia yield rate, demonstrates that the effectiveness of rutile TiO$_2$ as a suitable semiconductive support material under the experimental conditions. Rutile has a conduction band minimum energy just above 0 V (reported values include 0 V, −0.05 V and −0.23V) relative to the NHE. The conduction band values are however close to (or even below) the potential of the reversible hydrogen electrode at the pH value of 2 in the electrolyte, i.e. −0.12 V vs the NHE (according to the equation $E_{RHE}=E_{NHE}-0.059 \times pH$). Accordingly, it is believed that the HER is still suitably suppressed when rutile, and other support materials with a conduction band minimum energy close to, but just above, 0 V vs the NHE is used as the support material.

Example 10

The NRR performance of Fe—MoS$_2$ sample 4-1 was investigated in a continuous potential experiment, with 10 mM KOH electrolyte and continuous N$_2$ purging. An alkaline electrolyte was used to prevent reaction with the reduced iron on the electrocatalytic composition. The results, and those of the equivalent Ru-based catalyst (sample 1-3 prepared in example 1) are displayed in Table 7 (although the results are not directly comparable due to the different electrolytes).

TABLE 7

| Sample | Potential (mV vs RHE) | Electrolyte | NH$_3$ yield rate (mol cm$^{-2}$ s$^{-1}$) | Faradaic efficiency (%) |
|---|---|---|---|---|
| 4-1 (Fe-MoS$_2$; 2H MoS$_2$ polymorph) | −200 | KOH (10 mM) | 1.5 E−11 | 9.5 |
| 1-3 (Ru-MoS$_2$; 2H MoS$_2$ polymorph) | −200 | HCl (10 mM) | 5.8 E−11 | 4.1 |

Excellent faradaic efficiency of nearly 10% was obtained when using the iron-based electrocatalyst, higher even than for the equivalent ruthenium-based composition when tested at the same potential.

Example 11

2H-MoS$_2$ (c.a. 500 mg per experiment) was transferred to a silica crucible and placed in the centre of a quartz tube furnace. The furnace was initially purged with H$_2$ gas at a flowrate of 30 ml min$^{-1}$ for 1 hour before ramping up at 5° C. min$^{-1}$ to a desired target temperature, subsequently maintained for 3 hours. Finally, the reaction was cooled to room temperature and purged with Ar gas for 1 hour before the products were collected. At a reduction temperature of 850° C., the target product of the reaction was reduced molybdenum metal supported on residual molybdenum disulphide, i.e. Mo—MoS$_2$, designated sample 11-1. At a reduction temperature of 950° C., the target product of the reaction was substantially reduced molybdenum metal, designated sample 11-2.

Figure 12:
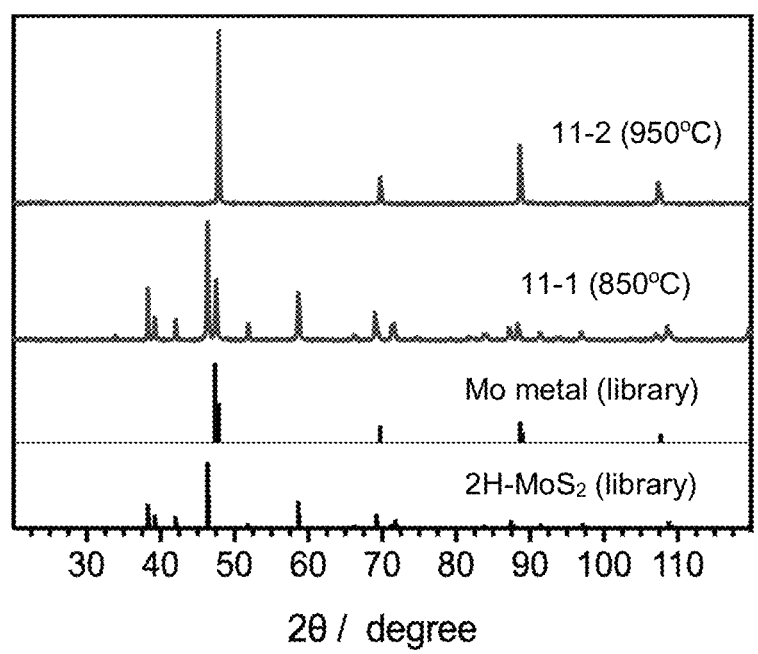
FIG. 12 depicts X-ray diffraction spectra (XRD) of Mo—$MoS_2$ sample 11-1 and Mo sample 11-2, prepared by $H_2$ reduction of 2H-$MoS_2$ in example 11.

Samples 11-1 and 11-2 were characterised by X-Ray diffraction, with the results obtained depicted in FIG. 12. By comparison against tabulated library data for pure Mo metal (COD 96-901-1607) and 2H-MoS$_2$ (COD 96-101-0994), it is evident that sample 11-1 includes a mixed phase of Mo metal and 2H-MoS$_2$, while sample 11-2 consists of a single phase of Mo metal.

Samples 11-1 and 11-2 were were dispersed in a 1:50 5% Nafion:methanol solution, and then drop-cast on 0.5 cm×1 cm carbon fibre paper substrates, at a loading of 0.5 mg·cm$^{-2}$. The resultant electrodes were evaluated for electrochemical nitrogen reduction reaction (NRR) performance at ambient temperature and pressure in a gastight two-compartment cell, with continuous N$_2$ purging and neat [C4mpyr][eFAP] was used as the working electrolyte ([C4mpyr][eFAP]=1-butyl-1-methylpyrrolidinium tris(pentafluoroethyl) trifluorophosphate). Ag|Ag$^+$|[C4mpyr][eFAP] confined behind a glass frit was used as reference electrode. The reference electrode was calibrated with Fc|Fc$^+$ and all potentials were calculated on the normal hydrogen electrode (NHE) scale (E/V vs. NHE=E/V vs. Ag|Ag+|[C4mpyr][eFAP]+1.23). A platinum wire auxiliary electrode was also separated from the working electrode by a P1 porosity glass frit.

The results at a potential of −970 mV vs NHE are shown in Table 8. It is evident that the mixed phase Mo—MoS$_2$ composition of sample 11-1 resulted in a threefold increase in activity and a substantial increase in selectivity towards NH$_3$, compared with the Mo metal phase only sample 11-2.

TABLE 8

| Sample | Potential (mV vs NHE) | NH3 yield rate (mol cm$^{-2}$ s$^{-1}$) | Faradaic efficiency (%) |
|---|---|---|---|
| 11-1 (Mo-MoS$_2$; 2H MoS$_2$ polymorph) | −970 | 2.5 E−12 | 15.3 |
| 11-2 (Mo metal) | −970 | 8.5 E−13 | 6.0 |

Those skilled in the art will appreciate that the invention described herein is susceptible to variations and modifications other than those specifically described. It is understood that the invention includes all such variations and modifications which fall within the spirit and scope of the present invention.

The invention claimed is:

1. A method of reducing dinitrogen to ammonia, the method comprising:
   contacting an electrocatalytic composition with dinitrogen and an electrolyte comprising a source of hydrogen; and
   applying a potential at the electrocatalytic composition sufficient to reduce the dinitrogen and the source of hydrogen on the electrocatalytic composition to form ammonia,
   wherein the electrocatalytic composition comprises:
   a support material present in one or more crystalline phases; and
   metallic clusters dispersed on the support material, the metallic clusters comprising at least one metal selected from ruthenium, iron, rhodium, iridium and molybdenum,
   wherein at least 80 mass % of the support material is present in a semiconductive crystalline phase having a conduction band minimum energy below (more positive than) −0.3 V relative to the normal hydrogen electrode (NHE),
   wherein the semiconductive crystalline phase is a 2D-crystalline phase and wherein the metallic clusters are at least partially intercalated between layers of the 2D-crystalline phase.

2. The method according to claim 1, wherein the semiconductive crystalline phase has a conduction band minimum energy below (more positive than) 0 V relative to the normal hydrogen electrode (NHE).

3. The method according to claim 1, wherein the support material comprises molybdenum disulphide (MoS$_2$).

4. The method according to claim 1, wherein the potential is in the range of −50 mV to −500 mV relative to the reversible hydrogen electrode (RHE).

5. The method according to claim 1, further comprising providing or replenishing the source of hydrogen in the electrolyte by oxidising a hydrogen-containing species at an anode in electrochemical communication with the electrolyte.

6. The method according to claim 1, further comprising recovering a product stream comprising the ammonia and recycling dihydrogen (H$_2$) present in the product stream for contact with the electrocatalytic composition and/or for oxidation at an anode in electrochemical communication with the electrolyte.

7. The method according to claim 1, wherein the electrolyte comprises an aprotic liquid, an ionic liquid or an ionic liquid dissolved in an aprotic liquid.

8. The method according to claim 1, wherein the metallic clusters comprise at least one metal selected from ruthenium, iron, rhodium and iridium.

9. The method according to claim 1, wherein at least 95 mass % of the support material is present in the semiconductive crystalline phase.

10. The method according to claim 1, wherein the metallic clusters have an average cluster size of from 1 to 10 nm.

11. The method according to claim 1, wherein the support material comprises molybdenum disulphide ($MoS_2$) and the 2D-crystalline phase comprises $2H\text{-}MoS_2$.

12. The method according to claim 1, wherein the support material comprises a transition metal dichalcogenide.

13. The method according to claim 1, wherein the metallic clusters comprise at least one metal selected from ruthenium and iron.

14. A method of reducing dinitrogen to ammonia, the method comprising:
  contacting an electrocatalytic composition with dinitrogen and an electrolyte comprising a source of hydrogen; and
  applying a potential at the electrocatalytic composition sufficient to reduce the dinitrogen and the source of hydrogen on the electrocatalytic composition to form ammonia,
  wherein the electrocatalytic composition comprises:
    molybdenum disulphide ($MoS_2$), wherein at least 80 mass % of the $MoS_2$ is present in the 2H-polymorphic form; and
    metallic clusters dispersed on the $MoS_2$, wherein the metallic clusters comprise at least one metal selected from ruthenium, iron, rhodium, iridium and molybdenum, and wherein the metallic clusters are at least partially intercalated between layers of $MoS_2$ in the 2H-polymorphic form.

15. The method according to claim 14, wherein the metallic clusters comprise at least one metal selected from ruthenium, iron, rhodium and iridium.

16. The method according to claim 14, wherein the metallic clusters comprise at least one metal selected from ruthenium and iron.

17. The method according to claim 14, wherein at least 95 mass % of the $MoS_2$ is present in the 2H-polymorphic form.

18. The method according to claim 14, wherein the metallic clusters have an average cluster size of from 1 to 10 nm.

19. The method according to claim 14, wherein the potential is in the range of −50 mV to −500 mV relative to the reversible hydrogen electrode (RHE).

20. The method according to claim 14, wherein the electrolyte comprises an aprotic liquid, an ionic liquid or an ionic liquid dissolved in an aprotic liquid.

* * * * *